US012739486B2

(12) United States Patent
Park

(10) Patent No.: US 12,739,486 B2
(45) Date of Patent: Sep. 15, 2026

(54) CAMERA INCLUDING IMAGE SENSOR AND ELECTRONIC APPARATUS COMPRISING SAME

(71) Applicant: SAMSUNG ELECTRONICS CO., LTD., Suwon-si (KR)

(72) Inventor: Jaeheung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 18/599,853

(22) Filed: Mar. 8, 2024

(65) Prior Publication Data

US 2024/0214660 A1 Jun. 27, 2024

Related U.S. Application Data

(63) Continuation of application No. PCT/KR2023/007196, filed on May 25, 2023.

(30) Foreign Application Priority Data

May 27, 2022 (KR) ........................ 10-2022-0065055
Sep. 15, 2022 (KR) ........................ 10-2022-0116038

(51) Int. Cl.
*H04N 23/54* (2023.01)
*H04N 23/55* (2023.01)

(52) U.S. Cl.
CPC ............. *H04N 23/54* (2023.01); *H04N 23/55* (2023.01)

(58) Field of Classification Search
CPC ............................... H04N 23/54; H04N 23/55
(Continued)

(56) References Cited

U.S. PATENT DOCUMENTS 8,139,147 B2 3/2012 Senga
9,148,553 B2 9/2015 Kim
9,578,217 B2 2/2017 Gutierrez et al.
10,063,756 B2 8/2018 Kim
10,175,499 B2 1/2019 Howarth
(Continued)

FOREIGN PATENT DOCUMENTS

CN 102447825 B 8/2014
CN 113132605 A 7/2021
(Continued)

OTHER PUBLICATIONS

Korean Notice of Patent Grant issued Jun. 3, 2024 in corresponding Korean Patent Application No. 10-2023-0067316.
(Continued)

*Primary Examiner* — Joel W Fosselman
(74) *Attorney, Agent, or Firm* — Nixon & Vanderhye P.C.

(57) ABSTRACT

A camera module according to various embodiments may include a first circuit board electrically connected to an image sensor or a circuit board including the image sensor, an actuator configured to control at least one of a position or a posture of the first circuit board within the camera module, a flexible circuit board extracted and extending from at least one side surface of the first circuit board, multiple slits, the slits being disposed between adjacent ones of multiple conductive wires mounted on the flexible circuit board, and a second circuit board electrically connected to one end of the flexible circuit board. The flexible circuit board may include a first section extracted from the first circuit board or extending from the first circuit board in a first direction. The flexible circuit board may include a second section extending from one end of the first section in a second direction different from the first direction or fixed to another component of the camera module. The flexible circuit board may be deformed as the actuator is driven.

20 Claims, 25 Drawing Sheets

(58) Field of Classification Search
USPC .......................................................... 348/374
See application file for complete search history.

(56) References Cited

U.S. PATENT DOCUMENTS

| | | | | |
|---|---|---|---|---|
| 10,969,652 | B2 | 4/2021 | Miller et al. | |
| 10,976,567 | B2 | 4/2021 | Barak | |
| 2007/0077805 | A1* | 4/2007 | Nomura | H04N 23/68 348/E5.046 |
| 2009/0126976 | A1 | 5/2009 | Iida | |
| 2016/0112642 | A1 | 4/2016 | Bohn | |
| 2017/0108705 | A1 | 4/2017 | Yu et al. | |
| 2018/0013938 | A1* | 1/2018 | Choi | H05K 1/028 |
| 2020/0412922 | A1 | 12/2020 | Lee et al. | |
| 2021/0092297 | A1 | 3/2021 | Smyth et al. | |
| 2021/0405321 | A1* | 12/2021 | Kwon | G03B 30/00 |
| 2022/0091398 | A1 | 3/2022 | Smyth | |
| 2022/0345598 | A1 | 10/2022 | Park | |

FOREIGN PATENT DOCUMENTS

| | | | |
|---|---|---|---|
| CN | 113206934 | A | 8/2021 |
| CN | 215420435 | U | 1/2022 |
| CN | 111567029 | B | 4/2022 |
| GB | 2601112 | A | 5/2022 |
| JP | 2009128521 | A | 6/2009 |
| JP | 2009186796 | A | 8/2009 |
| KR | 101785458 | B1 | 10/2017 |
| KR | 10-2020-0136744 | | 12/2020 |
| KR | 20220000785 | A | 1/2022 |
| KR | 20220056722 | A | 5/2022 |
| KR | 10-2023-0039495 | | 3/2023 |

OTHER PUBLICATIONS

International Search Report for PCT /KR2023/007196 mailed Sep. 5, 2023, 6 pages.

Written Opinion of the ISA for PCT /KR2023/007196 mailed Sep. 5, 2023, 4 pages.

Office Action for KR20230067316, with translation, dated Aug. 25, 2023, 10 pages.

Extended European Search Report dated Jun. 17, 2025 for EP Application No. 23812175.0.

India Office Action dated Mar. 19, 2026 for IN Application No. 202417078429.

* cited by examiner

CAMERA INCLUDING IMAGE SENSOR AND ELECTRONIC APPARATUS COMPRISING SAME

CROSS-REFERENCE TO RELATED APPLICATIONS

This application is a continuation of International Application No. PCT/KR2023/007196 designating the United States, filed on May, 25, 2023, in the Korean Intellectual Property Receiving Office and claiming priority to Korean Patent Application Nos. 10-2022-0065055, filed on May, 27, 2022, and 10-2022-0116038, filed on Sep. 15, 2022, in the Korean Intellectual Property Office, the disclosures of all of which are incorporated by reference herein in their entireties.

BACKGROUND

Field

The disclosure relates to a camera for capturing an image and an electronic apparatus including the camera.

Description of Related Art

A camera applied to a mobile phone may be located on at least one of a front surface and a rear surface and may operate to provide a function of capturing photos and videos. For a user's optical image stabilization (OIS) and an auto-focusing (AF) function when capturing images, the camera may include an actuator configured to at least partially move the optical system or an image sensor to acquire clear photos and videos.

The image sensor may be connected to be powered or to communicate with other components within the electronic apparatus. A flexible printed circuit board may be used to electrically connect the image sensor to other components.

The types of optical systems included in a camera include a direct-under type optical system in which light passing through the optical axis of a camera lens from a subject directly enters an image sensor without being refracted, and a refraction type optical system in which light passing through the optical axis of a lens from a subject is refracted in the process of passing through components of the optical system and enters an image sensor. The refraction type optical system may also be referred to as a folded type optical system.

A camera actuator for optical image stabilization and auto-focusing, in the form of moving a lens carrier containing an optical system including a camera lens, drives a lens relative to a fixed image sensor, so a circuit (e.g., a printed circuit board (PCB)) interconnecting the image sensor and other components does not need to move. However, in the case of a sensor shift type actuator, which moves an image sensor to perform optical image stabilization or auto-focusing, a repulsive force of a circuit interconnecting an image sensor and other components serves as an obstacle to the movement of the image sensor when the image sensor moves in a driving direction (e.g., the x-axis, the y-axis, or the z-axis direction). In order to reduce the repulsive force, a circuit connector is configured on a metal surface in the form of a leaf spring that is deformed in the moving direction of the image sensor may be used, or a flexible circuit board connected to the image sensor may be folded or deformed several times or may be increased in the length of a deformable area to be easily deformed in the moving direction.

Alternatively, in the case of a camera including a refraction type optical system, a flexible circuit board may be extracted from a position corresponding to the central axis of an image sensor (e.g., a direction corresponding to the optical axis direction of the optical system), and in order to reduce the repulsive force, the flexible circuit board may be branched into two or more portions and placed on the bottom surface of an optical component (e.g., a lens barrel or a prism).

However, when a circuit connector configured on a metal surface in the form of a leaf spring is used, the manufacturing cost of components of the camera increases. In addition, for force balancing, the circuit connector configured on the metal surface in the form of a leaf spring is applicable only in a limited structure.

When a structure in which a flexible circuit board connecting an image sensor with other components is folded multiple times to correspond to the moving direction of the image sensor is applied, the manufacturing cost increases because a process for forming the folded structure is added. In addition, since the direction and magnitude of the repulsive force vary depending on the folded positions of the flexible circuit board, the actuator may be designed inefficiently to secure an extra driving force of the actuator, and current consumption of the actuator may increase. In addition, in order for the flexible circuit board has a folded shape, the length of the flexible circuit board is increased. Accordingly, noise of a signal transmitted through a conductive wire mounted on the flexible circuit board and resistance of the conductive wire may be increased.

In addition, the structure of reducing the repulsive force by folding the flexible circuit board is easily applied to a structure of performing correction in the x-axis and y-axis to execute shift OIS, but it is difficult to form a structure for reducing the repulsive force that serves as an obstacle to z-axis driving for roll axis rotation correction and auto-focusing control.

In the case of a camera module including a refraction type optical system, when a flexible circuit board is extracted from an image sensor and branched into two or more portions, the branched flexible circuit board is placed on the central axis of a circuit board on which the image sensor is mounted in order to balance the repulsive force in opposite side directions of the branched area. In this case, there is a limitation in that the flexible circuit board is to be disposed on the bottom surface of an optical component (e.g., a lens barrel or a prism) to enable the optical system to function. In addition, since the flexible circuit board cannot be disposed around the lens barrel facing a subject due to the position at which the flexible circuit board is extracted, the light-reception surface of the image sensor is inevitably disposed in substantially the same direction as the direction toward the subject. Thus, there is a limitation to form the structure of the device.

The technical problems addressed by this disclosure are not limited to those described above, and other technical problems, which are not described above, may be clearly understood by those ordinarily skilled in the related art to which this disclosure belongs.

SUMMARY

Embodiments of the disclosure provide a camera or an electronic apparatus including the camera that may include a circuit connector between an image sensor and a circuit in which a repulsive force is reduced by separating a flexible circuit board portions between areas in which conductive wires are mounted.

A camera module according to an example embodiment may include a first circuit board electrically connected to an image sensor or a circuit board including the image sensor, an actuator configured to control at least one of a position or a posture of the first circuit board within the camera module, a flexible circuit board extracted or extending from at least one side surface of the first circuit board, multiple slits, is the slits being disposed between adjacent ones of multiple conductive wires mounted on the flexible circuit board, and a second circuit board electrically connected to one end of the flexible circuit board. The flexible circuit board may include a first section extracted from the first circuit board or extending from the first circuit board in a first direction. The flexible circuit board may include a second section extending from one end of the first section in a second direction different from the first direction or fixed to another component of the camera module. The flexible circuit board may be configured to be deformed as the actuator is driven.

A camera module according to an example embodiment may include a first circuit board electrically connected to an image sensor or a circuit board including the image sensor, an actuator configured to control at least one of a position or a posture of the first circuit board within the camera module, a flexible circuit board extracted and extending from at least one side surface of the first circuit board, multiple slits, the slits being disposed between adjacent ones of multiple conductive wires mounted on the flexible circuit board, and a second circuit board connected to one end of the flexible circuit board. The flexible circuit board may include a first section extracted from a position deviated to one side from a central axis of the first circuit board and extending in a first direction, and a second section extending from one end of the first section in a second direction different from the first direction.

An electronic apparatus according to an example embodiment may include a camera module including camera circuitry, a circuit board electrically connected to an image sensor or a circuit board including the image sensor, an actuator configured to control at least one of a position or a posture of the circuit board within the camera module, a fixed portion fixed inside the electronic apparatus, and a flexible circuit board interconnecting the circuit board and the fixed portion and including an operating section configured to be deformed as the actuator is driven. Multiple slits may be formed in the operating section.

According to various example embodiments disclosed herein, it is possible to provide a device in which a circuit connector between an image sensor and a circuit is configured using a flexible circuit board that may be manufactured inexpensively and a repulsive force for movement of the image sensor generated due to the circuit connector may be reduced. In addition, it is possible to provide a device in which components may be efficiently arranged without increasing the size of a camera module. In addition, it is possible to provide a device capable of easily implementing roll rotation correction and auto-focusing functions (e.g., z-shift) in addition to 2-axis (x-axis, y-axis) optical image stabilization (OIS). Furthermore, it is possible to provide a device in which a flexible circuit board is arranged in a form that at least partially surrounds the periphery of a position where an optical component is disposed in a camera module including a refraction type optical system while avoiding the position where the optical component is disposed so that the efficiency of component arrangement can be improved.

Effects that are capable of being obtained by the disclosure are not limited to those described above, and other effects not described above may be clearly understood by those ordinarily skilled in the art to which the disclosure belongs based on the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings. The following example embodiments may be implemented individually or may be implemented by combining one or more of the following embodiments. Therefore, the technical idea presented in this disclosure is not interpreted as being limited to an embodiment.

In this disclosure, singular forms of components may be interpreted as including plural forms unless the context clearly limits other cases. In this disclosure, the drawings may be exaggerated in order to more clearly describe various embodiments.

Figure 1:
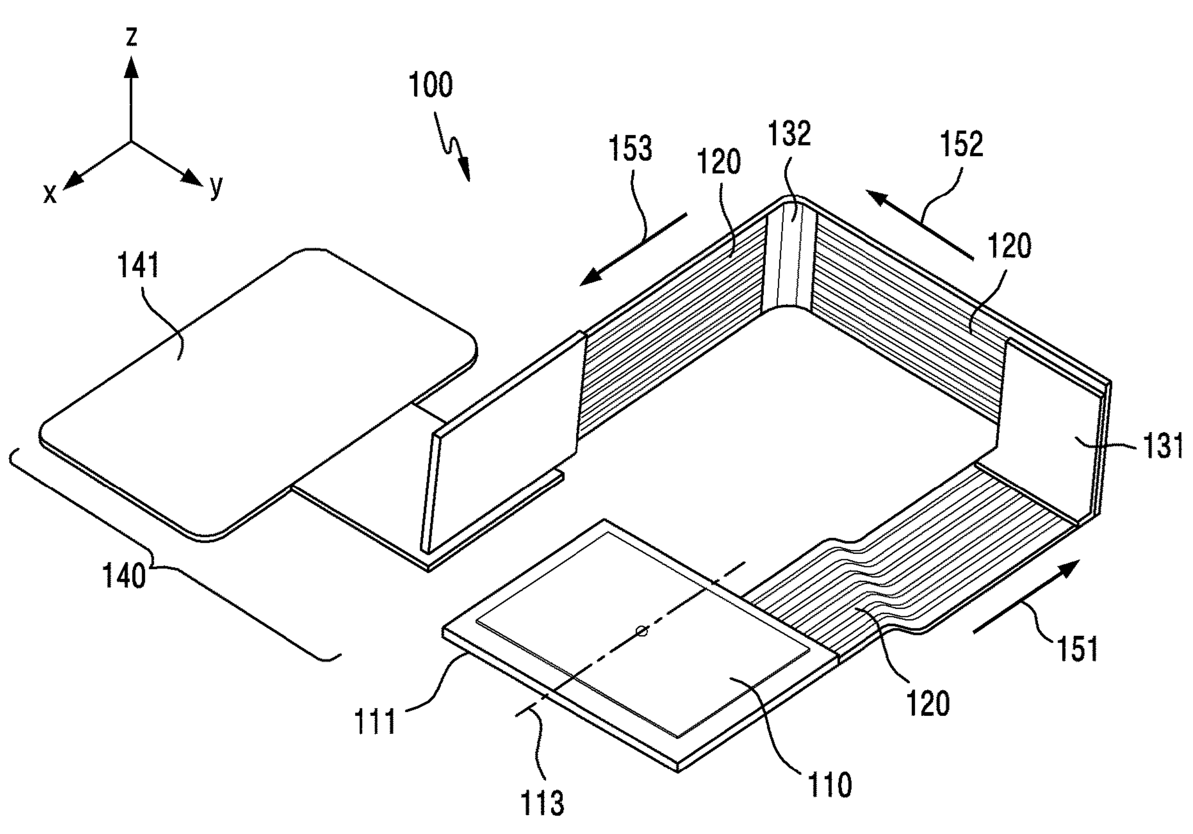
FIG. 1 is a diagram illustrating an example structure of a circuit connector configured to connect an image sensor and components other than the image sensor according to various embodiments.
Figure 1:
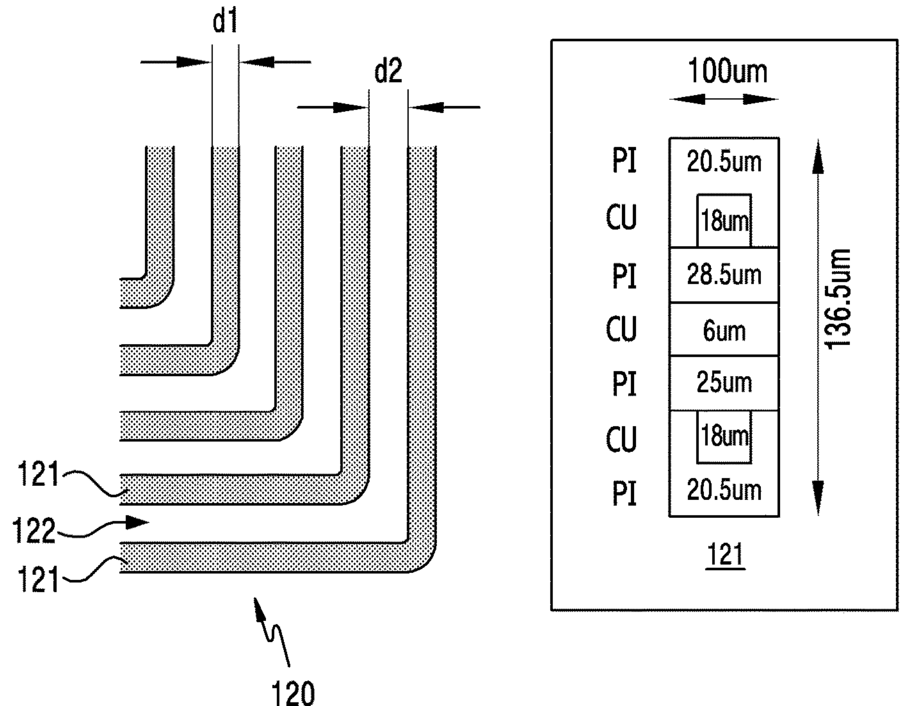

FIG. 1 includes a diagram and a perspective view illustrating an example structure of a circuit connector 100 configured to interconnect an image sensor 110 and components other than the image sensor 110 according to various embodiments.

FIG. 1 is a view illustrating a structure of a circuit connector 100 configured to interconnect an image sensor 110 according to an embodiment and components other than the image sensor 110.

The image sensor 110 and the circuit connector 100 illustrated in FIG. 1 may be included in a camera module. The image sensor 110 according to an embodiment may be mounted on a circuit board 111. A separate circuit board on which the image sensor 110 is mounted may be electrically connected to the circuit board 111. In this disclosure, the circuit board 111 on which the image sensor 110 is mounted may be understood as including a case where the image sensor 110 is directly mounted on the circuit board 111 and a case where another board on which the image sensor 110 is mounted is mounted on the circuit board 111. In this disclosure, a component interconnecting the image sensor 110 or a component other than the circuit board 111 (e.g., a camera module including the image sensor 110 or another circuit board included in an electronic apparatus including the camera module) may be referred to as a circuit connector 100.

The circuit connector 100 according to an embodiment may include a flexible circuit board 120 including a section extracted from the circuit board 111 and extending in a first direction 151. The flexible circuit board 120 may include multiple conductive wires 121 configured to electrically connect the image sensor 110 or the circuit board 111 to other components. In the flexible circuit board 120, some portions between areas in which the multiple conductive wires 121 are disposed are separated. According to various embodiments, gaps may be provided in the flexible circuit board 120 to at least partially separate the portions between the areas in which the multiple conductive wires 121 are disposed. According to various embodiments, in the circuit connector 100 included in the camera module, the gaps may include multiple slits 122 disposed side by side at least partially along the areas where the multiple conductive wires 121 are disposed.

At least one of the position or the posture of the image sensor 110 according to an embodiment within the camera module may be controlled by an actuator. When the image sensor 110 is moved by the actuator, since a fixed portion 140 of the circuit connector 100 is fixed to the camera module or the electronic apparatus, a repulsive force against the movement of the image sensor 110 will act on the circuit board 111 by the connection structure between the fixed portion 140 and the circuit board 111. In the flexible circuit board 120 according to an embodiment, by at least partially separating the portions between the areas in which the plurality of conductive wires 121 are disposed, it is possible to reduce the repulsive force.

According to an embodiment, in order to manufacture the circuit connector 100 between the image sensor 110 and other components, without using a metal component in the form of a leaf spring that requires a separate microfabrication process (e.g., an etching process), it is possible to reduce the repulsive force due to the flexible circuit board 120 by manufacturing a general flexible circuit board and removing unused areas between the conductive wires by a method of partially cutting (e.g., laser cutting) the flexible circuit board. When the circuit connector 100 according to an embodiment is applied to a camera module including a ball guide type actuator in which movement of the actuator is guided by a sphere included in the camera module, it is possible to maintain the horizontality of the image sensor even if a force balancing structure is not included.

In order to reduce the repulsive force of the flexible circuit board, a structure in which the flexible circuit board is folded multiple times in a direction perpendicular to a direction in which the flexible circuit board moves may be applied. However, in order to form the folded structure on the flexible circuit board, the length of the flexible circuit board is increased. Compared to the structure in which the flexible circuit board is folded multiple times to reduce the repulsive force in the direction in which the flexible circuit board moves, in the electronic apparatus according to an embodiment, it is possible to reduce the repulsive force while limiting the increase in the length of the flexible circuit board 120. In addition, it is possible to reduce the loss of driving force of the actuator due to a deviation occurring in a section in which the flexible circuit board 120 is folded in an operating section in which the shape of the circuit connector 100 is deformed as the position of the image sensor 110 is shifted.

According to an embodiment, since the repulsive force of the flexible circuit board 120 having multiple slits is very small, it may be easy to implement a structure for performing roll rotation correction around the optical axis on the x-y plane of the image sensor and an auto-focusing function by shifting the height of the lens in the z-axis direction.

According to an embodiment, since the flexible circuit board 120 having the multiple slits 122 has a low repulsive force, the flexible circuit board does not need to be extracted from the center of one side edge of the circuit board 111 configured to mount the image sensor 110 thereon in order to maintain force balancing. Referring to FIG. 1, the flexible circuit board 120 according to an embodiment may be extracted from a position deviated from the central axis 113 of the circuit board 111. Accordingly, the flexible circuit board 120 is extracted from a position deviated from the optical axis of the lens of the camera and may be easily disposed away from the position where an optical component (a lens barrel or a prism) is disposed. Accordingly, the direction in which the image sensor 110 receives light is not limited to the direction in which the lens barrel faces a subject, and may be disposed in other directions.

The flexible circuit board 120 according to an embodiment may include a section extending from one end of the section, which extends in the first direction 151, in a second direction 152 different from the first direction 151. When a bent area exists between the section extending in the first direction 151 and the section extending in the second direction 152 due to the folding of the flexible circuit board 120, the circuit connector 100 according to an embodiment may include a rigid area or a stiffener 131 to maintain the shape of the bent area. Referring to FIG. 1, the flexible circuit board 120 may further include a section bent at one end of the section extending in the first direction 151 and then curved to extend in the second direction 152. The stiffener 131 may be attached to an area including a bent area on the flexible circuit board 120.

The flexible circuit board according to an embodiment may further include a section extending from one end of the section, which extends in the second direction 152, in a third direction 153 different from the second direction 152. When an area in which the flexible circuit board 120 is bent also exists between the section extending in the second direction 152 and the section extending in the third direction 153, a rigid area or a stiffener 132 may be disposed.

The flexible circuit board 120 illustrated in FIG. 1 is illustrated as including the section extending in the first direction 151, the section extending in the second direction 152, and the section extending in the third direction 153. However, the disclosure is not limited thereto. It should be noted that the embodiment illustrated in FIG. 1 is intended to describe a structure in which the flexible circuit board 120 configured such that multiple conductive wires are separated from each other extends in two or more directions, thereby reducing the repulsive force caused by the flexible circuit board 120 and facilitating the arrangement of other optical components.

In the flexible circuit board 120 according to an embodiment, in order to reduce a repulsive force generated when the image sensor 110 is moved and transmitted to the circuit board 111 on which the image sensor 110 is mounted, a slit 122 may be formed between adjacent ones of the conductive wires 121 so that the conductive wires 121 can be separated from each other. Each conductive wire 121 may have a structure including three layers. For example, polyimide PI may be disposed on both sides of each of conductors CU. The conductors CU may be disposed again on the polyimide PI on both sides, respectively, and areas in which respective conductive wires 121 are disposed may be configured in a structure in which each of the conductors is covered by the polyimide PI. For example, a polyimide layer having a 28.5 μm thickness and a polyimide layer having a 25 μm thickness may be respectively disposed on both surfaces of a CU layer having a 6 μm thickness and comprising a conductive wire. A CU conductive wire having an 18 μm thickness may be disposed on each of the two polyimide layers. Each of the CU conductive wires may be disposed to be covered with polyimide having a thickness of 20.5 μm. However, the structure of an area in which conductive wires are disposed is not limited thereto. For example, the width of the conductive wires illustrated in FIG. 1 is 100 μm, the thickness of the flexible circuit board is 136.5 μm, and the numerical values described for respective structures are only for explaining an example and are not limited thereto.

For example, the width d1 of the conductive wires 121 may be about 100 μm, and the distance d2 between adjacent ones of the conductive wires 121 may be 150 μm. The flexible circuit board 120 may include multiple (e.g., 12) conductive wires. However, the disclosure is not limited thereto, and the width and gap of the conductive wires and the quantity of the conductive wires may be changed depending on the type of the image sensor 110 and the configures of circuit elements of the electronic apparatus.

The central portion of the area in which the flexible circuit board 120 including the conductive wires 121 is connected to the circuit board 111 configured to mount the image sensor 110 thereon does not need to be extracted from the central portion of one side of the circuit board 111, but may be extracted from an unrestricted position and may extend in a specific direction on the first plane. For example, the first plane may be a light receiving surface of the image sensor 110 or a surface substantially parallel to the light receiving surface. As another example, the first plane may be a plane substantially perpendicular to the light receiving surface of the image sensor 110. However, the arrangement of the first plane is not limited to the above-described example. The shape in which the flexible circuit board 120 extends is not limited to a single straight line. For example, the flexible circuit board 120 may have a shape of being extracted from the circuit board 111, extending in the first direction 151, and extending in the second direction 152 different from the first direction 151. With reference to the x-axis, the y-axis, and the z-axis, which are orthogonal to each other, the flexible circuit board 120 may have a shape of extending in the z-axis direction, extending in the x-axis direction, and extending in the y-axis direction from one end of the portion extending in the x-axis direction. For example, the first direction 151 may be the −x-axis direction, the second direction 152 may be the −y-axis direction, and the third direction may be the x-axis direction. The flexible circuit board 120 extending from the circuit board 111 may be attached to a fixed portion 140 including a rigid area at a fixed position in the camera module or an area reinforced by a stiffener. The flexible circuit board 120 one side of which is fixed may extend to be fixed to a camera module or an electronic apparatus including the camera module and may configure a connector 141. At each position where the flexible circuit board 120 is bent, the flexible circuit board 120 may be bent in the state in which the conductive wires are joined together without a slit machined between adjacent ones of the conductive wires. A rigid stiffener may be attached to the flexible circuit board 120 to maintain the bent shape at the bent position. The connector 141 of the circuit connector 100 may be fixed to a camera module or an electronic apparatus including the camera module.

Figure 2:
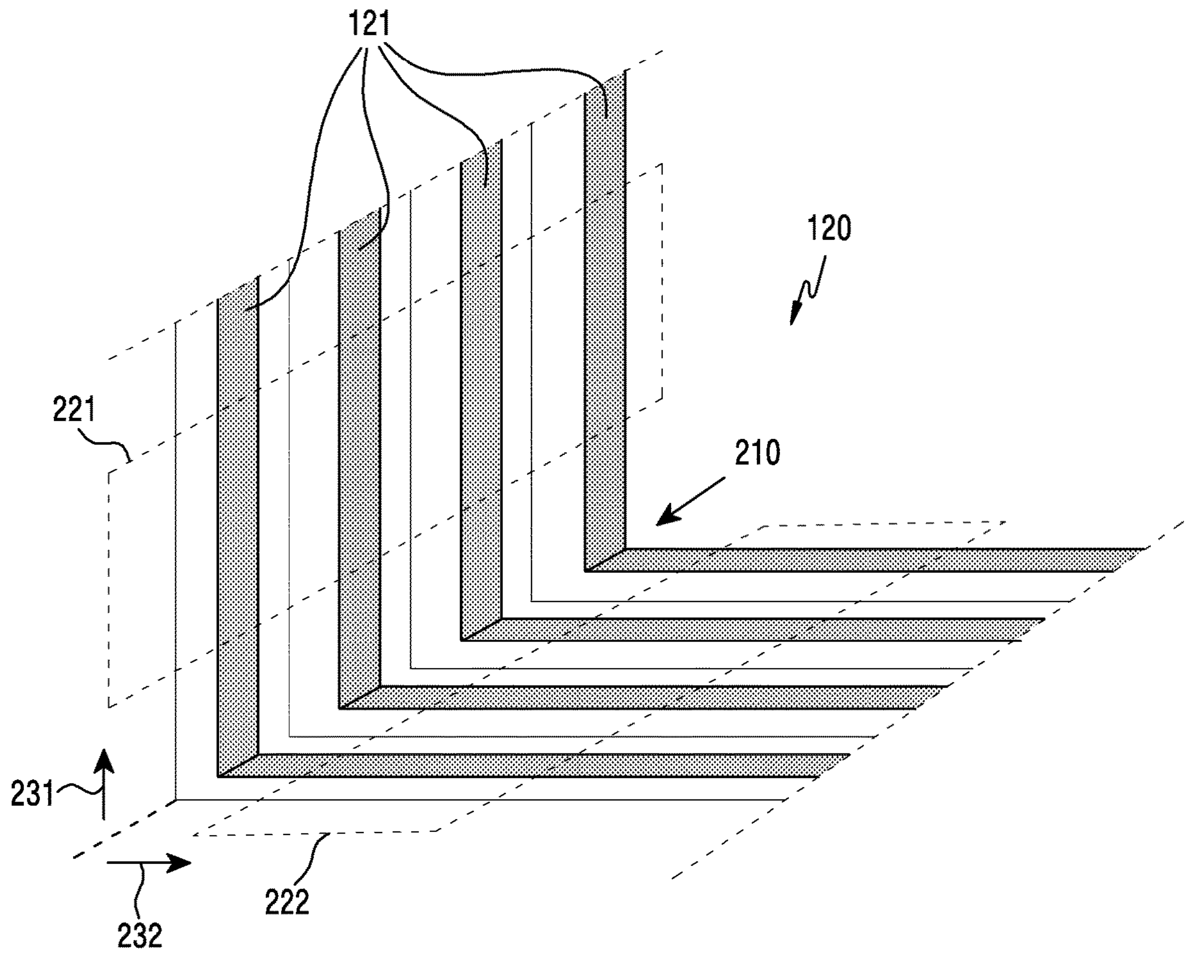
FIG. 2 is a diagram illustrating an example structure in which a flexible circuit board is folded and bent according to various embodiments.

FIG. 2 is a perspective view illustrating an example structure in which the flexible circuit board 120 is folded and bent according to various embodiments. The description "the flexible circuit board 120 is bent" in this disclosure may refer to a structure obtained by folding the flexible circuit board 120, which causes the direction in which the flexible circuit board 120 extends to change. Referring to FIG. 2, with reference to the folded point 210 of the flexible circuit board 120, at least some of the conductive wires 121 of the flexible circuit board 120 extending in a first direction 231 may be disposed in a first plane 221. With reference to the folded point 210 of the flexible circuit board 120, at least some of the conductive wires 121 of the flexible circuit board 120 extending in the second direction 232 may be disposed in a second plane 222 which is not parallel to the first plane 221. An area where the flexible circuit board 120 includes the folded point 210 may be referred to as a bent area.

The flexible circuit board 120 illustrated in FIG. 2 has been described with reference to the shape thereof in a state in which no external force is applied thereto. In addition, the structure of the flexible circuit board 120 illustrated in FIG. 2 is merely an example for illustrating terms for describing various embodiments, and terms used in this disclosure are not limited to meaning that the disclosure should be physically completely identical to the shape illustrated in FIG. 2.

Figure 3:
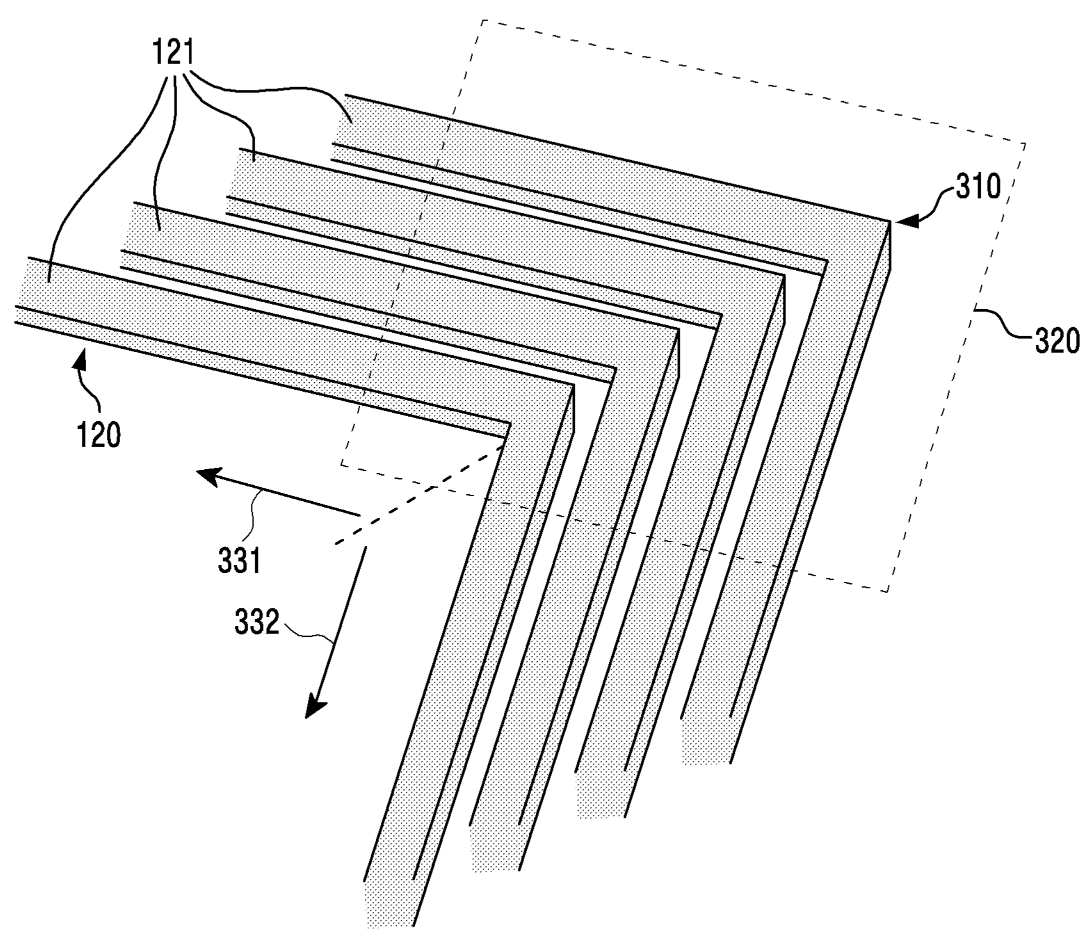
FIG. 3 is a diagram illustrating an example structure in which a direction in which a flexible circuit board extends is curved according to various embodiments.

FIG. 3 is a perspective view illustrating an example structure in which a direction in which a flexible circuit board 120 extends is curved according to various embodiments.

The description "the flexible circuit board 120 is curved" in this disclosure may refer, for example, to a structure in which the direction in which the conductive wires 121 disposed on the flexible circuit board 120 are disposed to extend changes with reference to a curved point 310. As the direction in which the conductive wires 121 are disposed to extend changes, the direction in which the flexible circuit board 120 extends may also change.

The conductive wires 121 included in the flexible circuit board 120 extending in a first direction 331 with reference to the curved point 310 and the conductive wires 121 included in the flexible circuit board 120 extending in a second direction 332 may be disposed on one plane 320. An area including the curved point 310 in which the flexible circuit board 120 is curved may be referred to as a curved area.

The flexible circuit board 120 illustrated in FIG. 3 has been described with reference to the shape thereof in a state in which no external force is applied thereto. In addition, the structure of the flexible circuit board 120 illustrated in FIG. 3 is merely an example for illustrating terms for describing various embodiments, and terms used in this disclosure are not limited to meaning that the disclosure should be physically completely identical to the shape illustrated in FIG. 3.

Figure 4:
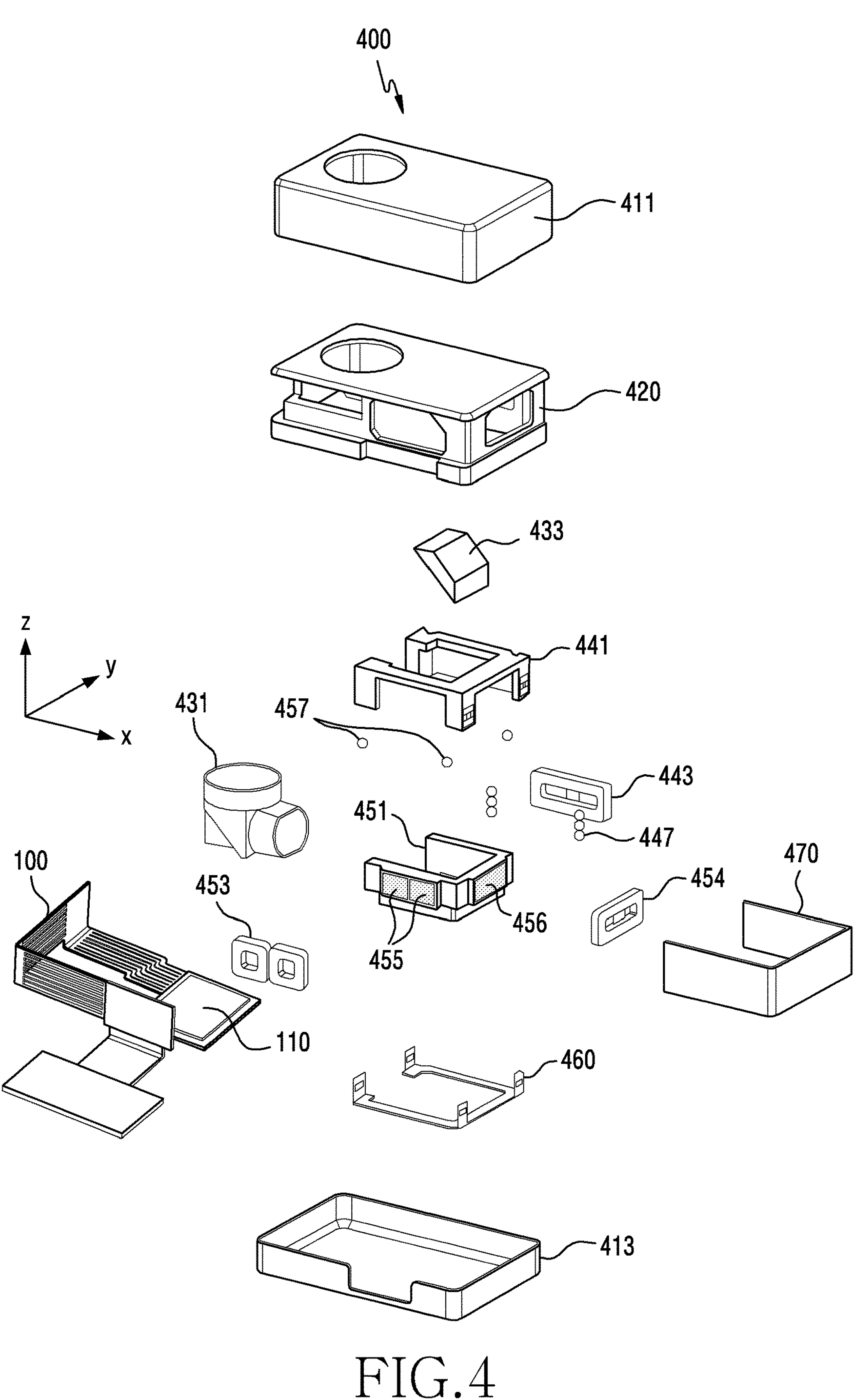
FIG. 4 is an exploded perspective view illustrating an example configuration of a camera module including an image sensor according to various embodiments.

FIG. 4 is an exploded perspective view illustrating an example configuration of a camera module 400 according to various embodiments.

The camera module 400 according to an embodiment may include an upper shield can 411 and a lower shield can 413. The components of the camera module 400 may be accommodated in a space between the upper shield can 411 and the lower shield can 413. The image sensor 110 of the camera module 400 may be connected to an external circuit of the camera module 400 via the circuit connector 100. The image sensor 110 may be disposed on a carrier (e.g., at least one of an OIS carrier 451 or an AF carrier 441). The OIS carrier 451 may be driven by an attractive or repulsive force (or a Lorentz force) generated between OIS coils 453 and 454 and OIS magnets 455 and 456. The AF carrier 441 may be driven by an attractive force or repulsive force (or a Lorentz force) generated between an AF coil 443 and an AF magnet (not illustrated). By fixing the circuit board on which the image sensor 110 is disposed to the carrier, the image sensor 110 may be fixed to the carrier. The image sensor 110 fixed to the carrier may move as the carrier is driven. The camera module 400 may further include a housing 420 configured to arrange other components included in the camera module 400 at appropriate positions within the camera module 400.

The camera module 400 according to an embodiment may include an optical system including a lens 431 and a prism 433. The camera module 400 according to an embodiment may include a refraction type optical system in which a light path extending from a subject to the image sensor 110 via the lens 431 and the prism 433 is refracted one or more times.

The camera module 400 according to an embodiment may include an AF actuator configured to provide an auto-focusing function. Referring to FIG. 4, the AF actuator may include an AF carrier 441, an AF coil 443, an AF magnet (not illustrated), and AF balls 447. The AF magnet (not illustrated) may be disposed on one surface of the AF carrier 441 facing the AF coil 443. The AF carrier 441 may be driven by an attractive or repulsive force between an AF magnet (not illustrated) and the AF coil 443. The moving path of the AF carrier 441 may be guided by a guide groove provided to allow the AF balls 447 to roll therein (e.g., a rail provided in the AF carrier 441). As the AF carrier 441 is driven, the image sensor 110 disposed on the AF carrier 441 moves so that a focus control function can be executed.

The camera module 400 according to an embodiment may include an OIS actuator configured to provide an optical image stabilization function. Referring to FIG. 4, the OIS actuator may include an OIS carrier 451, y-axis OIS coils 453, y-axis OIS magnets 455, an x-axis OIS coil 454, an x-axis OIS magnet 456, and an OIS balls 457. The y-axis OIS magnets 455 may be disposed on one surface of the OIS carrier 451 facing the y-axis OIS coils 453. The x-axis OIS magnet 456 may be disposed on one surface of the OIS carrier 451 facing the x-axis OIS coil 454. The OIS carrier 451 may be driven by an attractive or repulsive force between the y-axis OIS coils 453 and the y-axis OIS magnets 455 and/or an attractive or repulsive force between the x-axis OIS coil 454 and the x-axis OIS magnet 456. The movement of the OIS carrier 451 may be guided by a guide groove provided to allow the OIS balls 457 to roll therein (e.g., a rail provided in the OIS carrier 451). As the OIS carrier 451 is driven, the image sensor 110 disposed on the OIS carrier 451 moves so that an optical image stabilization function can be executed.

The camera module 400 according to an embodiment may further include a z-axis stopper 460 and a circuit board 470. The z-axis stopper 460 may limit the movement range of the OIS carrier 451 and/or the AF carrier 441 in the z-axis direction. The circuit board 470 may be connected to at least one of the AF coil 443, the y-axis OIS coil 453, or the x-axis OIS coil 454. The circuit board 470 may include a flexible printed circuit board (FPCB).

Components of the camera module 400 illustrated in FIG. 4 are for purposes of illustration, and the camera module 400 according to an embodiment may further include other components or some of the components may be omitted. The camera module 400 may include multiple components illustrated in FIG. 4, as a single component. For example, although two y-axis OIS coils 453 and y-axis OIS magnets 455 are illustrated in FIG. 4, the camera module according to an embodiment may include a y-axis OIS actuator that may be configured with one y-axis OIS coil and one y-axis OIS magnet. According to an embodiment, the magnets and coils of the OIS actuator may be arranged in a solenoid method other than a Lorentz method. As another example, FIG. 4 illustrates the camera module 400 in which the OIS carrier 451 and the AF carrier 441 are guided using the OIS balls 457 and the AF balls 447, but at least one of the OIS carrier 451 or the AF carrier 441 may be guided using a wire.

Figure 5:
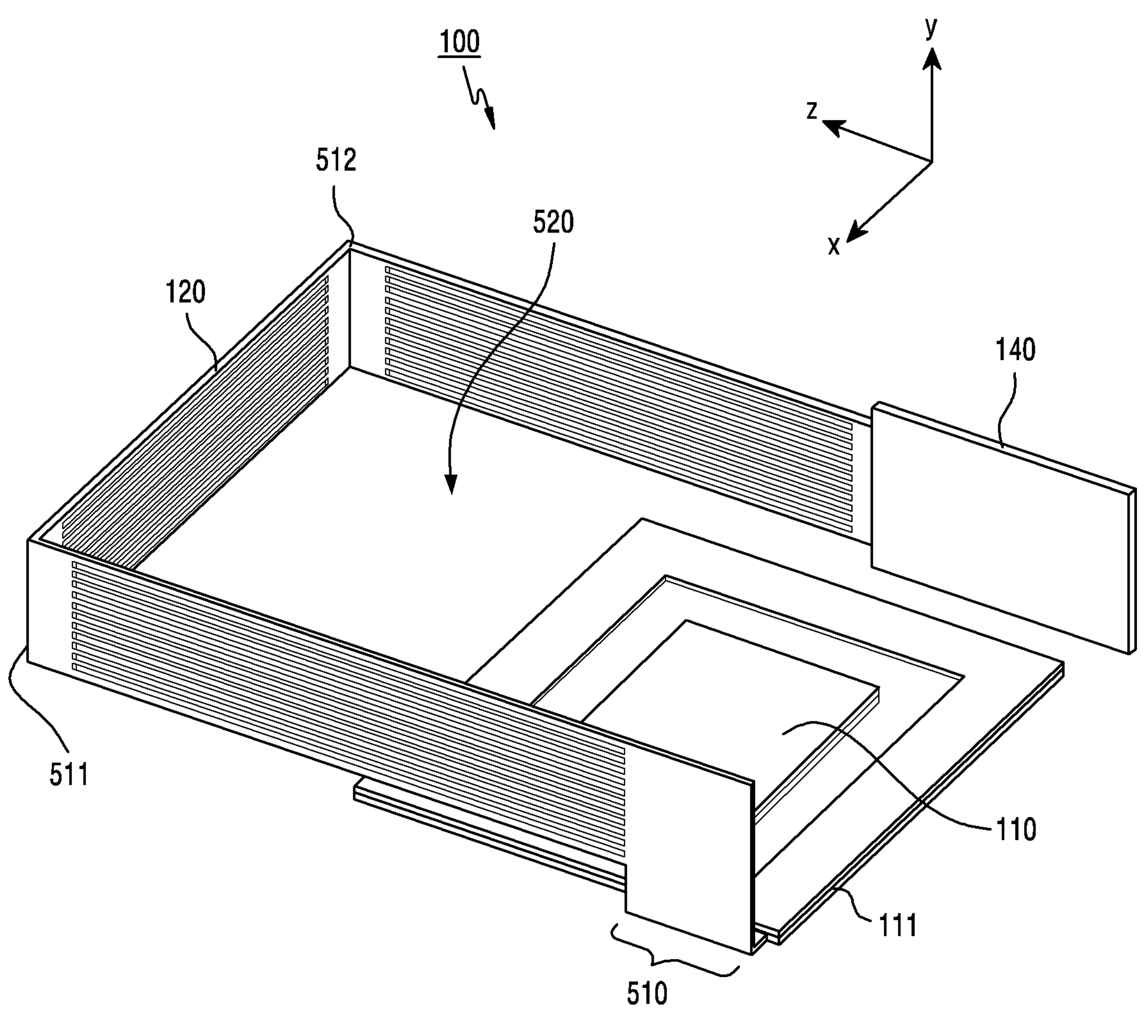
FIG. 5 is a perspective view illustrating an example structure of a circuit connector configured to connect an image sensor and components other than the image sensor according to various embodiments.

FIG. 5 is a perspective view illustrating an example structure of a circuit connector 100 configured to interconnect an image sensor 110 and components other than the image sensor according to various embodiments.

A flexible circuit board 120 according to an embodiment may include a bent section 510 bent to extend in the y-axis direction from a position where the flexible circuit board 120 is extracted from a circuit board 111 on which the image sensor 110 is disposed. A rigid area or a stiffener may be disposed in the bent section 510 to maintain the shape of the flexible circuit board 120. The flexible circuit board 120 may include a section extending in the y-axis direction from the bent section 510. The flexible circuit board 120 may be curved in the bent section 510 and may then extend in the z-axis direction. Referring to FIG. 5, in a section where the flexible circuit board 120 extends in the z-axis direction, the surface on which the flexible circuit board 120 is disposed may not be parallel to the plane where the light-receiving surface of the image sensor 110 is disposed (e.g., the x-z plane).

The flexible circuit board 120 may be bent to extend in the −x-axis direction from one end of the portion extending in the z-axis direction. The flexible circuit board 120 may further include a section extending in the −x-axis direction from the bent section 511. A rigid area or a stiffener configured to maintain the shape of the flexible circuit board 120 may be disposed in the section 511 in which the flexible circuit board 120 bent at one end of the portion extending in the z-axis direction is bent.

The flexible circuit board 120 may be bent to extend in the −z-axis direction from one end of the portion extending in the −x-axis direction. The flexible circuit board 120 may further include a section extending in the −z-axis direction from the bent section 512. One end of the portion of the flexible circuit board 120 extending in the −z-axis direction may be connected to a fixed portion 140. Although not illustrated in FIG. 5, the fixed portion 140 may include or be connected to a connector for connecting to another circuit. In an embodiment, a rigid area or a stiffener may be disposed in the bent section 512 to maintain the shape of the flexible circuit board 120.

Since the flexible circuit board 120 is extracted from one side of the circuit board 111 and disposed to surround a space 520, an optical system (not illustrated) included in a camera module (not illustrated) may be disposed in the space 520, which is at least partially surrounded by the flexible circuit board 120.

Figure 6:
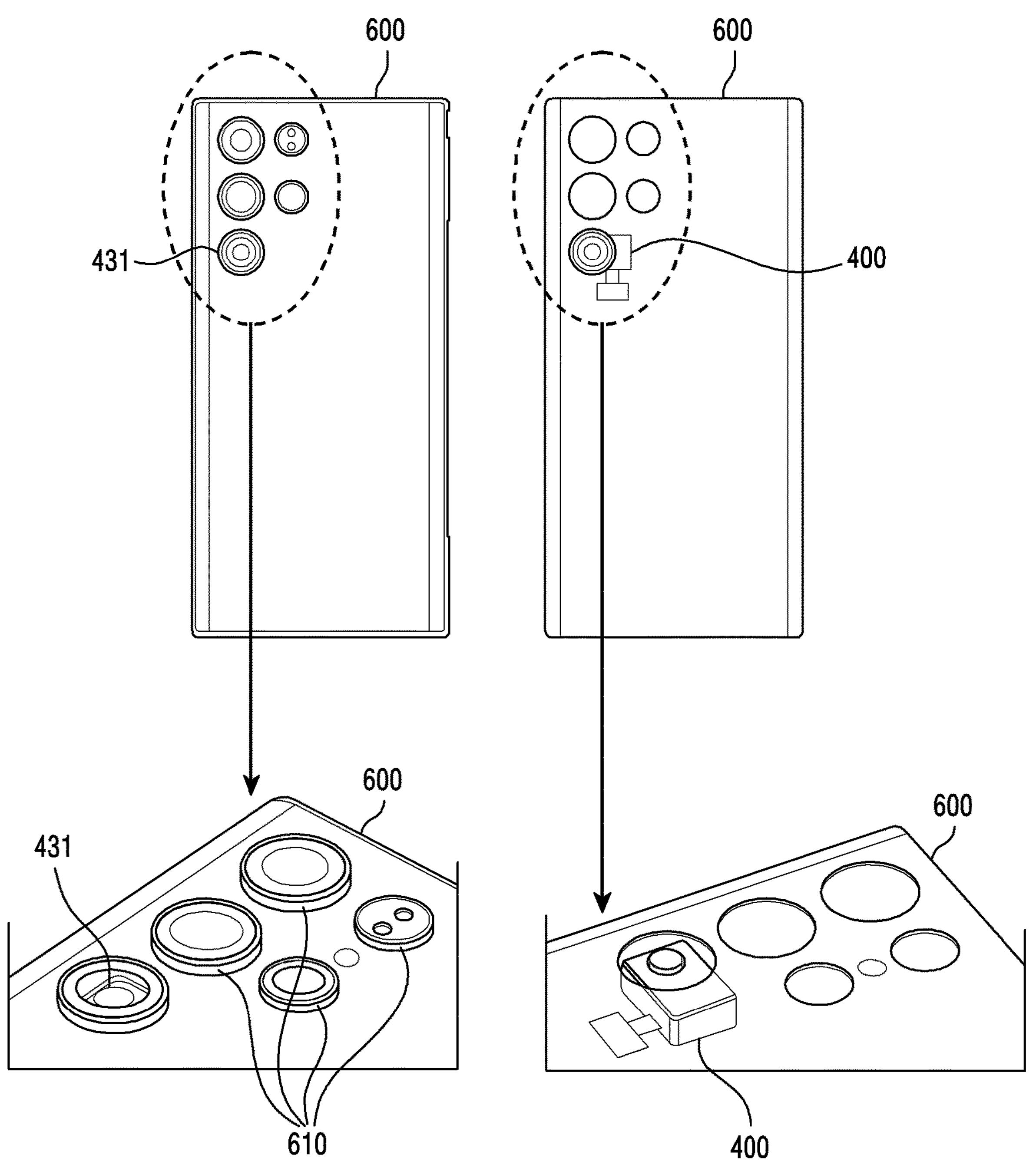
FIG. 6 is a diagram illustrating an example of a state in which the camera module illustrated in FIG. 5 is mounted in an electronic apparatus according to various embodiments.

FIG. 6 is a diagram illustrating an example of a state in which the camera module 400 illustrated in FIG. 5 is mounted in an electronic apparatus 600 according to various embodiments.

The camera module 400 according to an embodiment may be disposed such that a lens 431 faces the outside of the electronic apparatus 600. The electronic apparatus 600 may further include other openings 610 in addition to the opening through which the lens 431 of the camera module 400 is exposed. The electronic apparatus 600 may further include other components disposed at positions within the electronic apparatus 600 corresponding to positions where the other openings 610 are formed. For example, the electronic apparatus 600 may further include at least one of a camera, a proximity sensor, or a flash.

FIG. 6 illustrates an example in which the camera module 400 is disposed in the electronic apparatus 600, and the position of the camera module 400 in the electronic apparatus 600 is not limited to the example illustrated in FIG. 6. For example, the camera module 400 may be an under-display camera (UDC) disposed on the rear surface of a display of the electronic apparatus 600.

Figure 7A:
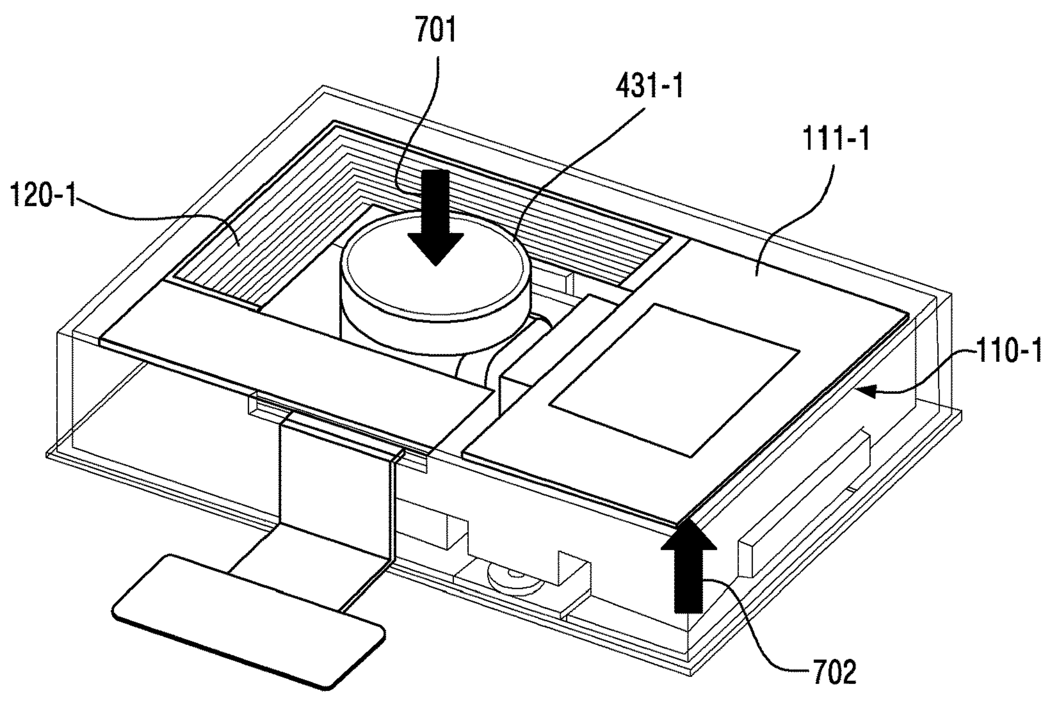
FIGS. 7A and 7B are perspective views illustrating respectively a direction in which light enters a camera module from a subject through a lens and a direction in which an image sensor receives light in a camera module according to various embodiments.
Figure 7B:
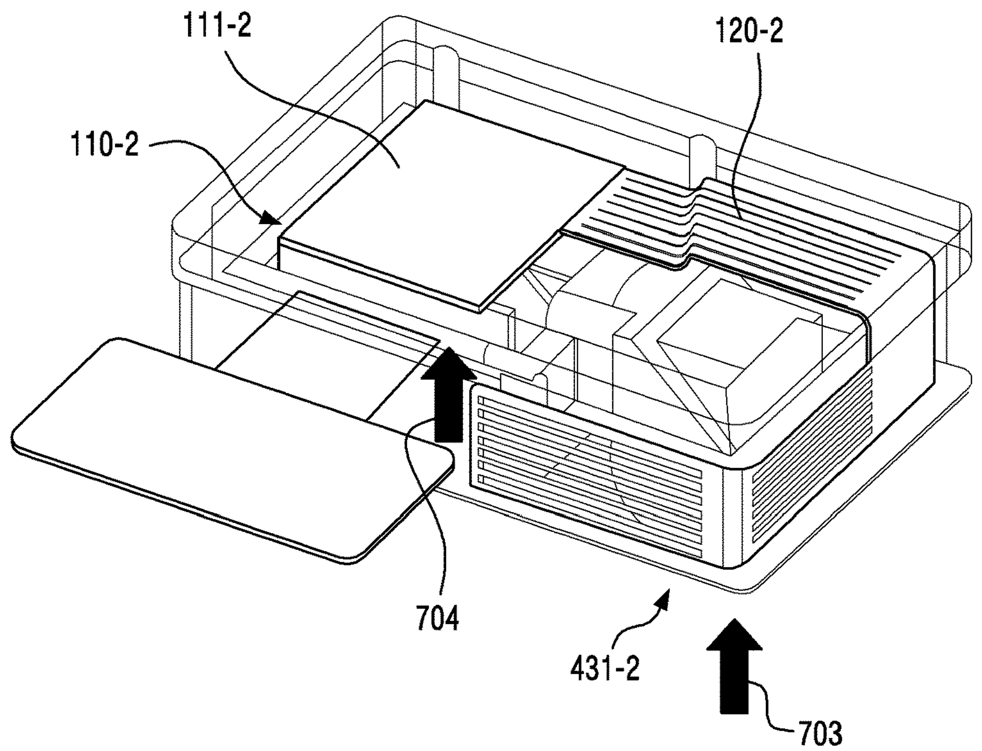

FIGS. 7A and 7B are perspective views illustrating respectively a direction in which light enters a camera module from a subject through a lens and a direction in which an image sensor receives light in a camera module according to various embodiments.

Referring to FIG. 7A, a circuit board 111-1 on which an image sensor 110-1 according to an embodiment is mounted may be disposed on a side the lens 431-1 faces within the camera module. A flexible circuit board 120-1 may be extracted and extend from the circuit board 111-1 on which the image sensor 110-1 is mounted and may be disposed in a form at least partially surrounding a periphery of optical components (e.g., a lens barrel 431-1, a prism, or a reflective member including a reflector that reflects light).

When the flexible circuit board 120-1, an optical component, and the image sensor 110-1 are arranged as illustrated in FIG. 7A, a first direction 701 in which light is incident on the lens 431-1 from a subject and a second direction 702 in which light is incident on the image sensor 110-1 may be substantially opposite to each other.

Referring to FIG. 7B, a circuit board 111-2 on which an image sensor 110-2 according to an embodiment is mounted may be disposed on a side opposite to the direction a lens 431-2 faces within the camera module. According to an embodiment, the flexible circuit board 120-2 may pass under the optical component and may extend to surround the periphery of the optical component.

When a flexible circuit board 120-2, an optical component, and an image sensor 110-2 are arranged as illustrated in FIG. 7B, a third direction 703 in which light is incident on the lens 431-2 from a subject and a fourth direction 704 in which light is incident on the image sensor 110-2 may be substantially equal to each other.

As illustrated in FIGS. 7A and 7B, an arrangement of components within a camera module may be more freely configured using a circuit connector according to various embodiments of the present disclosure.

Figure 8:
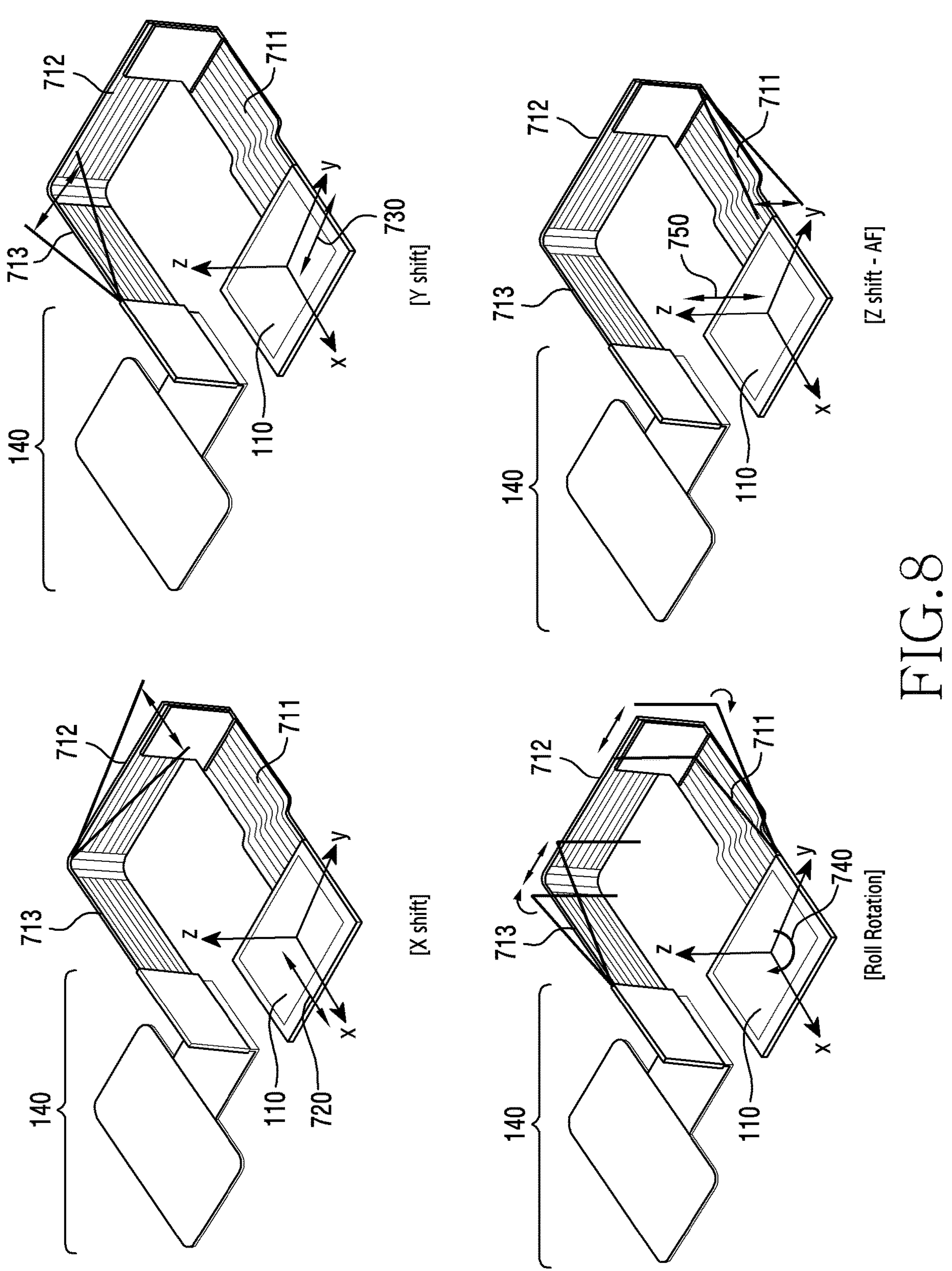
FIG. 8 is a perspective view illustrating directions in which a circuit connector may be deformed to allow movement of an image sensor as an optical image stabilization function or an auto-focusing function is executed according to various embodiments.

FIG. 8 is a diagram including perspective views illustrating various directions in which a circuit connector 100 may be deformed to allow movement of an image sensor 110 as an optical image stabilization function or an auto-focusing function is executed according to various embodiments.

When the electronic apparatus detects at least one component among a pitch axis direction, a yaw axis direction, or roll axis direction of the motion of the camera module, the electronic apparatus may drive the actuator included in the camera module such that the image sensor moves in at least one of the x-axis direction or the y-axis direction or the posture thereof is changed to execute optical image stabilization.

The circuit connector 100 of the camera module according to an embodiment may include at least one operating section, of which the shape is deformable according to the movement of the image sensor 110. For convenience of description, FIG. 8 illustrates an embodiment in which the circuit connector 100 includes a first operating section 711 extending from the image sensor 110, a second operating section 712 extending from the first operating section 711, and a third operating section 713 connected to a fixed portion 140 from the second operating section 712.

The image sensor 110 may be moved by driving the actuator. When the image sensor 110 moves in the x-axis direction 720 with reference to the fixed portion 140, the movement of the image sensor 110 in the x-axis direction 720 may be allowed while the second section 712 is deformed. When the image sensor 110 moves in the y-axis direction 730 with reference to the fixed portion 140, the movement of the image sensor 110 in the y-axis direction 730 may be allowed while the third section 713 is deformed. The image sensor 110 may perform roll rotation about the z-axis to execute optical image stabilization. When the image sensor 110 performs the roll rotation 740, the roll rotation 740 of the image sensor 110 may be allowed while the first section 711 and the third section 713 are deformed. According to the roll rotation 740 of the image sensor 110, the flexible circuit board including the first section 711 and the third section 713 may be deformed while shifting and rotating on the x-y plane.

To perform an auto-focusing (AF) function, the image sensor may move in the z-axis direction. When the image sensor 110 moves in the z-axis direction 750 with reference to the fixed portion 140, the movement of the image sensor 110 in the z-axis direction 750 may be allowed while the first section 711 is deformed. A flexible circuit board having multiple slits formed therein may minimize and/or reduce a repulsive force generated as the flexible circuit board is deformed.

FIG. 8 illustrates an operation of the circuit connector 100 according to an embodiment, and the description "some sections are deformed" does not necessarily require the remaining sections are not deformed. In addition, the movement of at least one of the position or the posture of the image sensor 110 may be executed by the operation of another section in addition to the operation of the above-described circuit connector 100.

As illustrated in FIG. 8, the operating direction of the flexible circuit board included in the circuit connector 100 may vary depending on the extension direction and the bent or curved position of the flexible circuit board according to various embodiments. However, a concept in which at least one of the position or the posture of the image sensor is changed while the flexible circuit board is deformed in the operating direction and a low repulsive force is generated may be equally applicable.

A section that is deformable as the image sensor is moved in the circuit connector 100 may be referred to as an operating section or an operating portion. A section which is not deformed and maintains a fixed shape even when the image sensor 110 is moved in the circuit connector 100 may be referred to as a fixed section or a fixed portion.

Figure 9:
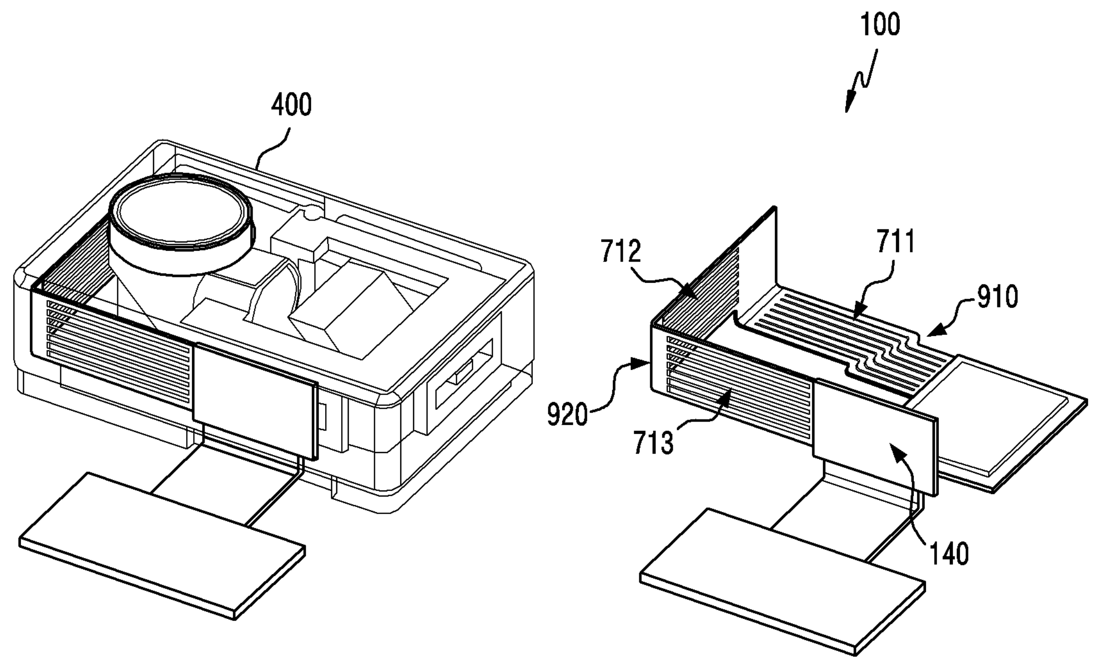
FIG. 9 is a perspective view illustrating a circuit connector in which a curved area is included in operating sections of a flexible circuit board, and a camera module including the circuit connector according to various embodiments.

FIG. 9 includes perspective views illustrating a circuit connector 100 in which a curved area 910 is included in operating sections 711, 712, and 713 of a flexible circuit board, and a camera module 400 including the circuit connector 100 according to various embodiments. In other drawings, reference numerals for some members described above are omitted.

A curved area 910 may also be included in the operating sections 711, 712, and 713 of the circuit connector 100 according to an embodiment. The curved area 910 may be provided to shift the position of the first operating section 711 so that one end of the first operating section 711 is connected to one end of the second operating section 712. In at least a portion of the curved area 910, the conductive wires disposed in the operating sections 711, 712, and 713 may be joined together without a separating gap (e.g., a slit) between conductive wires, or a smaller number of gaps than the number of gaps formed in the areas other than the curved area may be formed.

Referring to FIG. 9, a folded area and a curved area may be formed between the first operating section 711 and the second operating section 712 to change the direction in which the flexible circuit board extends. In addition, a curved area may also be formed in the area where the fixed portion 140 is disposed. In at least a portion of the curved area, the conductive wires may be joined together without a separating gap (e.g., a slit) between adjacent ones of the conductive wires, or a smaller number of gaps than the number of gaps formed in the areas other than the curved area may be formed.

Even in the bent area 920 (e.g., the bent areas 131 and 132 of FIG. 1 or the curved sections 511 and 512 of FIG. 5) formed in the circuit connector 100 according to an embodiment, the conductive wires may be joined together without a separating gap (e.g., a slit) between adjacent ones of the conductive wires, or a smaller number of gaps than the number of gaps formed in the areas other than the curved area may be formed.

Figure 10:
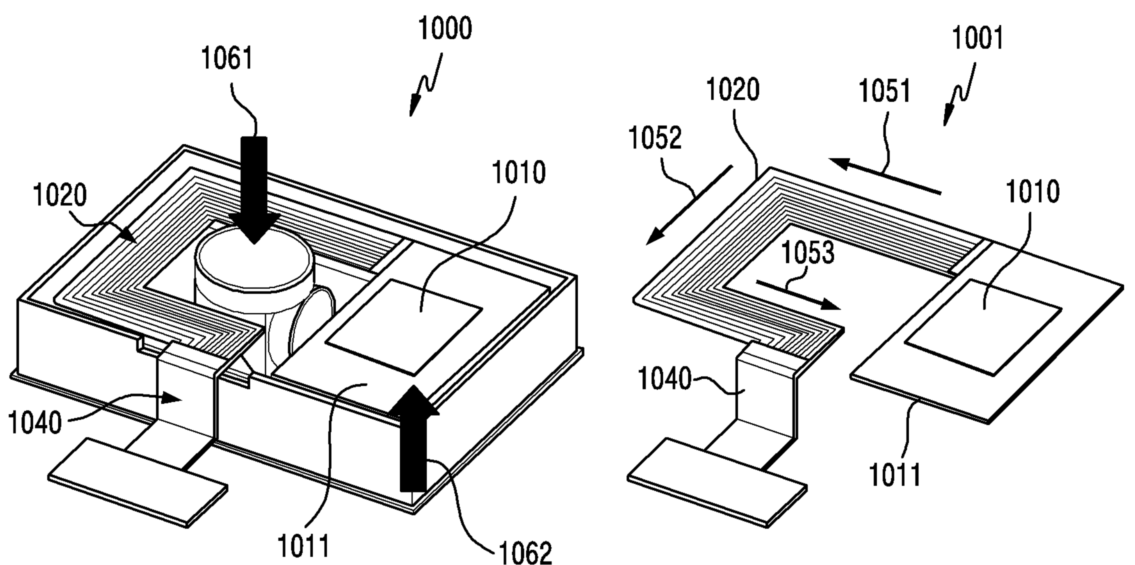
FIG. 10 is a perspective view illustrating an example in which a camera module is mounted with a circuit connector, wherein the circuit connector includes a slit section of a flexible circuit board, which is configured on substantially the same plane as an image sensor, and does not include a bent area in operating sections according to various embodiments.

FIG. 10 includes perspective views illustrating an example in which a camera module 1000 is mounted with a circuit connector 1001, wherein the circuit connector 1001 includes a slit section of a flexible circuit board 1020 that is configured on substantially the same plane as an image sensor 1010 and does not include a bent area in operating sections according to various embodiments.

Referring to FIG. 10, a circuit board 1011 on which the image sensor 1010 according to an embodiment is mounted may be disposed on the side the lens faces in the camera module 1000. According to the embodiment illustrated in FIG. 10, a first direction 1061 in which light is incident through the lens and a second direction 1062 in which the image sensor 1010 receives light may be substantially opposite to each other.

In order to dispose the image sensor 1010 as illustrated in FIG. 10, the flexible circuit board 1020 may be extracted from one side of the circuit board 1011 and may extend in a third direction 1051. The flexible circuit board 1020 may be curved from one end of the portion extending in the third direction 1051 and may extend in the fourth direction 1052. The flexible circuit board 1020 may be curved from one end of the portion extending in the fourth direction 1052 and may extend in the fifth direction 1053. The flexible circuit board 1020 may be connected to a fixed portion 1040 from one end of the portion extending in the fifth direction 1053. The area of the flexible circuit board 1020 connected to the fixed portion 1040 may be bent and connected to the fixed portion 1040 without being slit. The flexible circuit board 1020 may further include a curved area between one end of the portion extending in the fifth direction 1053 and the area connected to the fixed portion 1040.

As illustrated in FIG. 10, since the flexible circuit board 1020 according to an embodiment is disposed along the periphery of the optical component, even if the image sensor 1010 is disposed on the side the lens faces, the arrangement of the optical component may not be disturbed. In addition, the flexible circuit board 1020 according to an embodiment may secure a length for operating sections while preventing or inhibiting the length of the flexible circuit board 1020 from being unnecessarily long, and may maintain reduce the repulsive force applied to the circuit board 1011 at a low level.

Figure 11:
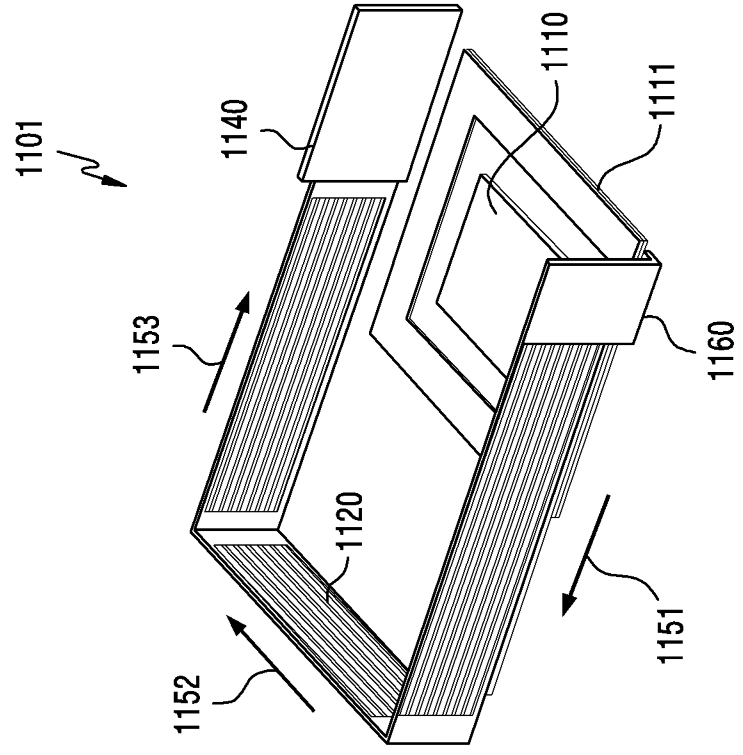
FIG. 11 is a perspective view illustrating an example in which a camera module is mounted with a circuit connector, wherein the circuit connector includes a slit section of a flexible circuit board, which is configured on a plane different from that on which an image sensor is disposed, and includes a bent area in operating sections according to various embodiments.
Figure 11:
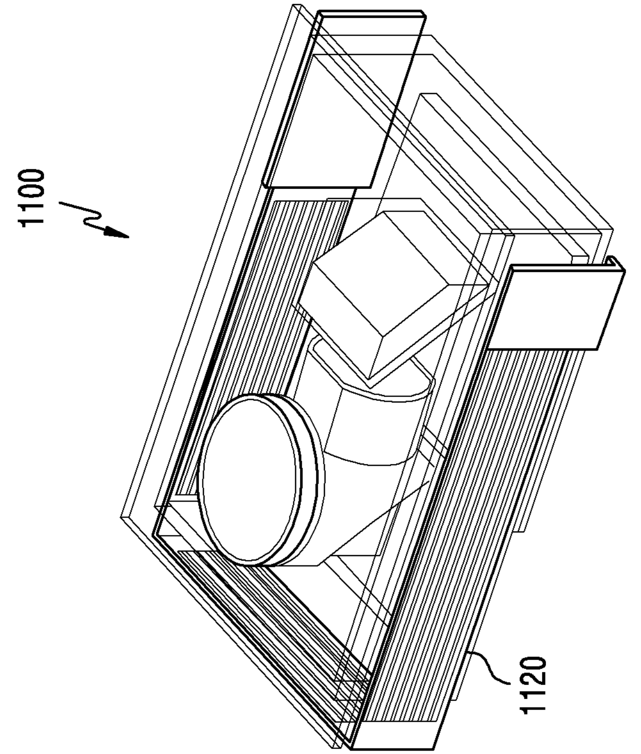

FIG. 11 includes perspective views illustrating an example in which a camera module 1100 is mounted with a circuit connector 1101, wherein the circuit connector 1101 includes a slit section of a flexible circuit board 1120 that is configured on a plane different from that on which an image sensor 1110 is disposed and includes a bent area in operating sections according to various embodiments.

The flexible circuit board 1120 may be extracted from the circuit board 1111 on which the image sensor 1110 is disposed and may extend in a first direction 1151 from a bent section 1160. The flexible circuit board 1120 may be curved in the bent section 1160 to extend in the first direction 1151. The flexible circuit board 1120 may be bent at one end of the portion extending in the first direction 1151 and may extend in a second direction 1152. The flexible circuit board 1120 may be bent at one end of the portion extending in the second direction 1152 and may extend in a third direction 1153. The flexible circuit board 1120 may be connected to the fixed portion 1140 at one end of the portion extending in the third direction 1153.

No slits may be formed in the bent section between the section extending in the first direction 1151 and the section extending in the second direction 1152, the bent section between the section extending in the second direction 1152 and the section extending in the third direction 1153, and the section 1160 extracted to be bent from the circuit board 1111. The bent section between the section extending in the first direction 1151 and the section extending in the second direction 1152, the bent section between the section extending in the second direction 1152 and the section extending in the third direction 1153, and the section 1160 extracted to be bent from the circuit board 1111 may be flexibly moved relative to the fixed portion 1140 as the slit sections are deformed.

Figure 12:
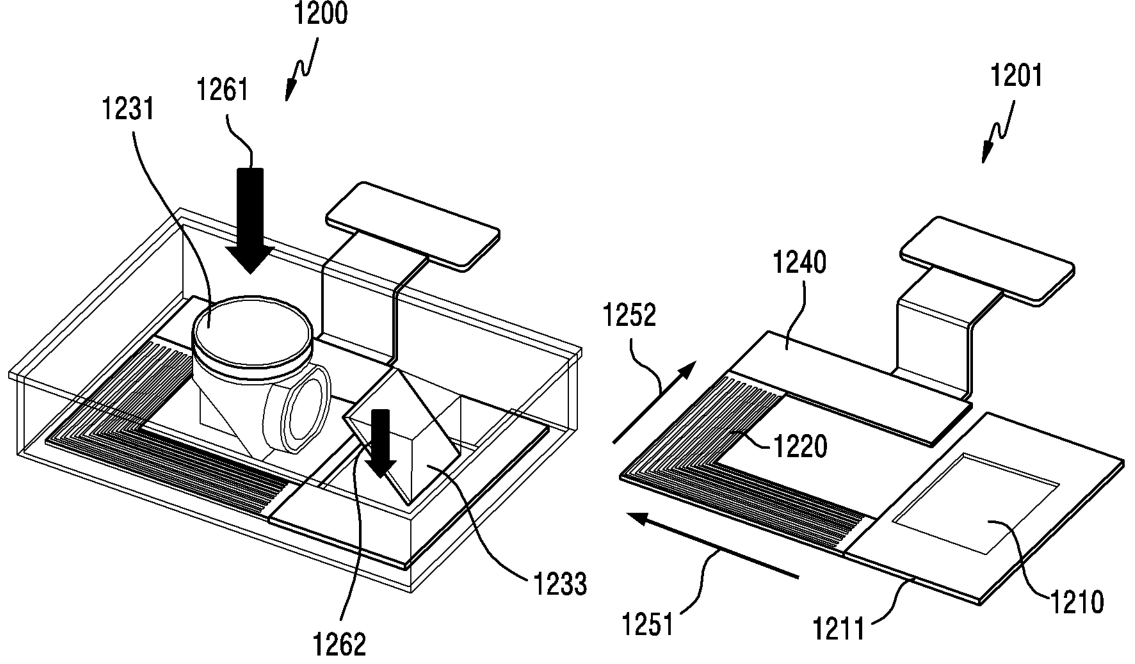
FIG. 12 is a perspective view illustrating a camera module and an image sensor and a circuit connector, which are mounted in the camera module, wherein the image sensor is disposed on the rear surface of an optical system such that a direction in which light enters a lens from a subject and a direction in which light is received by the image sensor are substantially the same according to various embodiments.

FIG. 12 includes perspective views illustrating a camera module 1200 and an image sensor 1210 and a circuit connector 1201, which are mounted in the camera module 1200, wherein the image sensor 1210 is disposed on the rear surface of an optical system such that a direction 1261 in which light enters a lens 1231 from a subject and a direction 1262 in which light is received by the image sensor are substantially the same according to various embodiments.

In the camera module 1200 according to an embodiment, light incident on the lens 1231 in the first direction 1261 may be incident on the image sensor 1210 in the second direction 1262, which is substantially the same as the first direction 1261, through an optical path that is refracted two or more times by passing through a lens barrel and a prism 1233.

The flexible circuit board 1220 extracted from the circuit board 1211 on which the image sensor 1210 is mounted may extend in the third direction 1251. The flexible circuit board 1210 may be curved at one end of the portion extending in the third direction 1251 and may extend in a fourth direction 1252. The flexible circuit board 1220 may be connected to the fixed portion 1240 at one end of the portion extending in the fourth direction 1252.

The flexible circuit board 1220 may be arranged such that the image sensor 1210 can be moved without disturbing the arrangement of the optical system.

Figure 13:
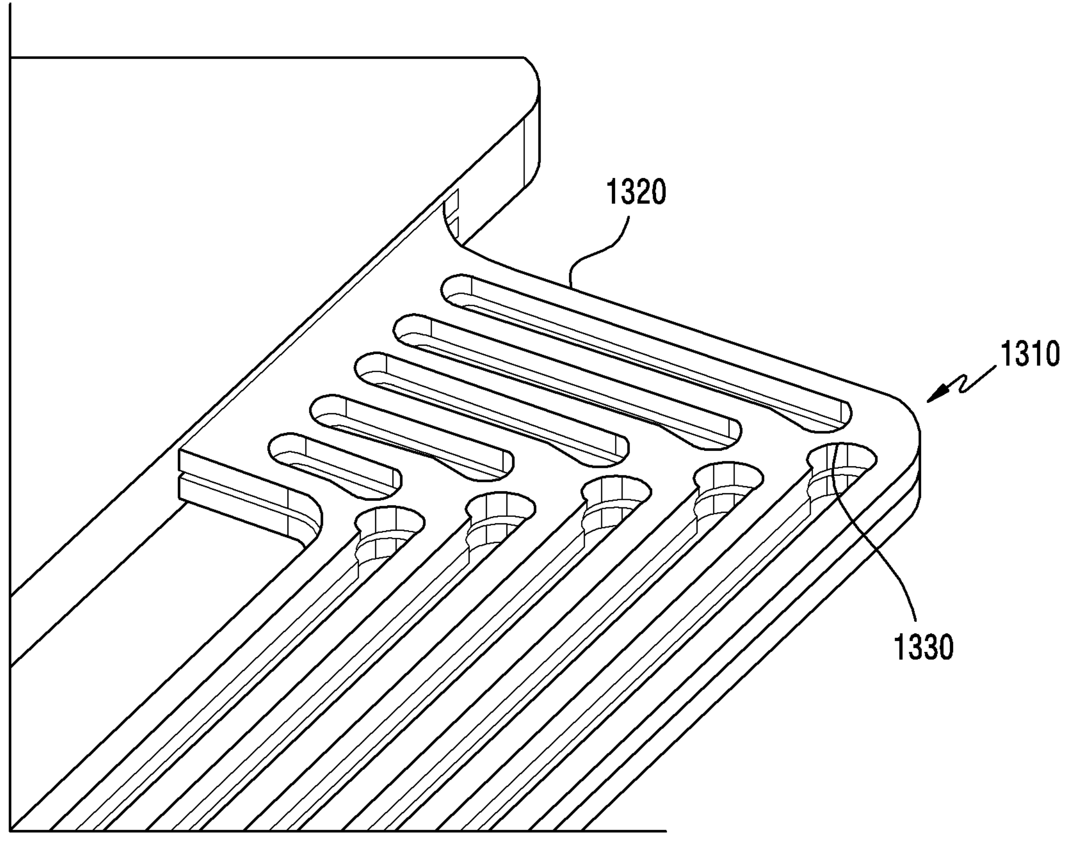
FIG. 13 is a perspective view illustrating a structure of a curved area of a flexible printed circuit board according to various embodiments.

FIG. 13 is a perspective view illustrating an example structure of a curved area 1310 of a flexible circuit board 1320 according to various embodiments.

A structure in which the direction in which the flexible circuit board 1320 extends is changed such that the surface on which conductive wires mounted on the flexible circuit board 1320 are disposed is folded may be referred to as a structure in which a flexible circuit board is bent. A structure in which the direction in which the flexible circuit board 1320 extends is changed such that the surface on which conductive wires mounted on the flexible circuit board 1320 are disposed is maintained may be referred to as a structure in which the direction of the flexible circuit board 1320 is curved. The description "the direction of the flexible circuit board 1320 is curved" may include not only a case where a curve is formed but also a case where an extension direction is changed to form an angle.

Referring to FIG. 13, in the flexible circuit board 1320 according to an embodiment, areas on which conductive wires are disposed may be joined together without a slit between adjacent ones of the areas or a smaller number of slits than other sections are formed in at least a portion of the section 1310 in which the direction in which the flexible circuit board 1320 extends is curved. The flexible circuit board 1320 according to an embodiment may include a connection structure 1330 (e.g., a bridge structure) between areas where the conductive wires are disposed adjacent to the curved area 1310. According to an embodiment, the connection structure 1330 may be configured to prevent or reduce excessive deformation of the flexible circuit board 1320 when the flexible circuit board 1320 is moved. For example, the connection structure 1330 may prevent or reduce twisting of the flexible circuit board 1320. FIG. 13 illustrates one example of the flexible circuit board 1320, and the number and/or positions of connection structures 1330 included in the flexible circuit board 1320 are not limited to the illustrated example.

Meanwhile, in the detailed description of the disclosure, various example embodiments have been described, but various modifications are possible without departing from the scope of the disclosure. For example, within a range in which a flexible circuit board including multiple slits is extracted from a circuit board on which an image sensor is mounted or a circuit board on which an image sensor is mounted is mounted and extends in at least two directions, a flexible circuit board may be configured in a form in which a portion of one type and a portion of another type are combined among the above-described flexible circuit boards. Therefore, the scope of the disclosure shall not be limited to the described embodiments, but includes not only based on the claims described below but also based on equivalents to the claims.

Figure 14:
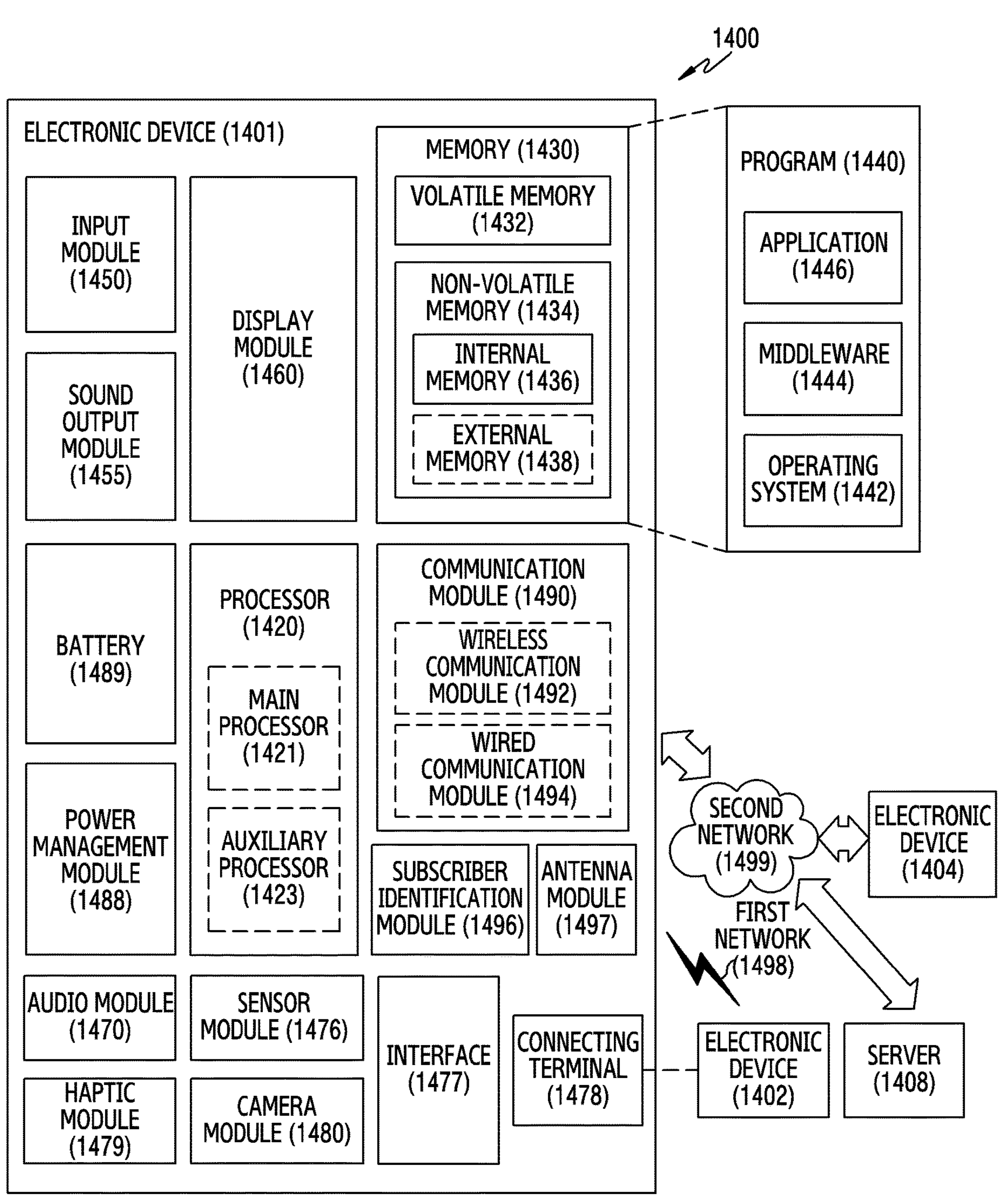
FIG. 14 is a block diagram illustrating an example electronic apparatus in a network environment according to various embodiments.

FIG. 14 is a block diagram illustrating an electronic device 1401 in a network environment 1400 according to various embodiments. Referring to FIG. 14, the electronic device 1401 in the network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In various embodiments, at least one of the components (e.g., the connecting terminal 1478) may be omitted from the electronic device 1401, or one or more other components may be added in the electronic device 1401. In various embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to an embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element including a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In an embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 15:
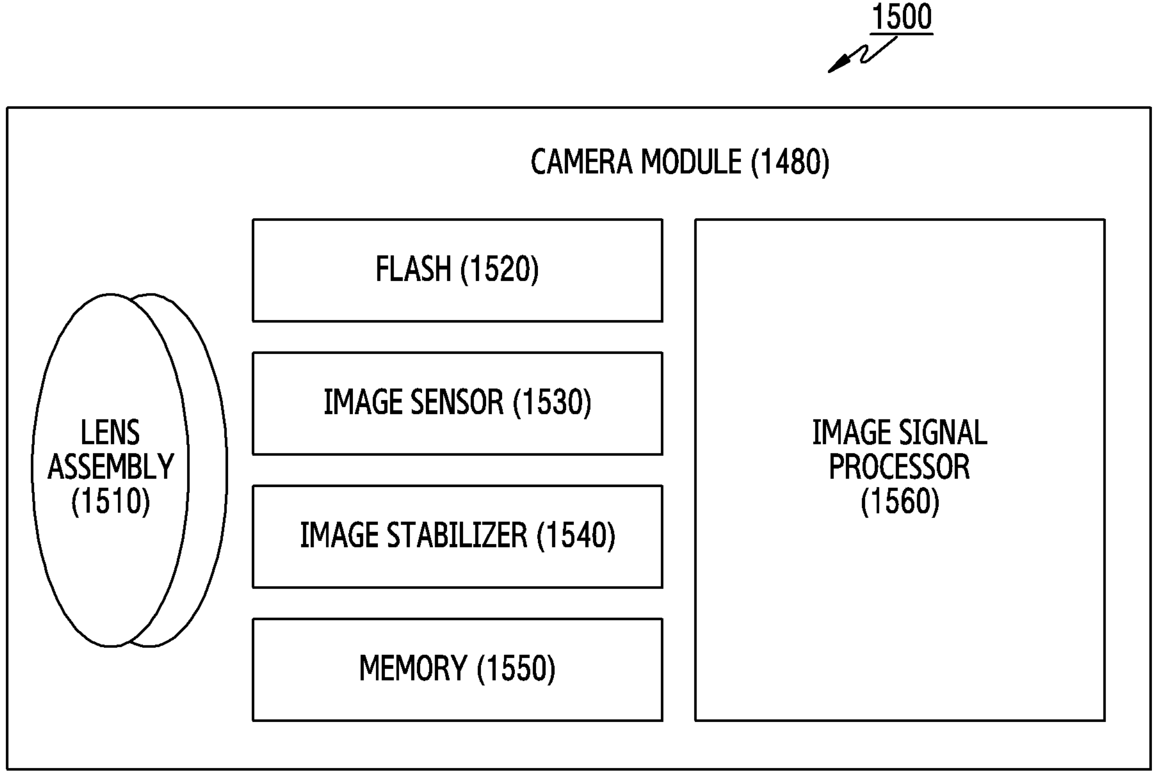
FIG. 15 is a block diagram illustrating an example configuration of a camera module according to various embodiments.

FIG. 15 is a block diagram 1500 illustrating and example configuration of the camera module 1480 according to various embodiments. Referring to FIG. 15, the camera module 1480 may include a lens assembly 1510, a flash 1520, an image sensor 1530, an image stabilizer 1540, memory 1550 (e.g., buffer memory), or an image signal processor 1560. The lens assembly 1510 may collect light emitted or reflected from an object whose image is to be taken. The lens assembly 1510 may include one or more lenses. According to an embodiment, the camera module 1480 may include a plurality of lens assemblies 1510. In such a case, the camera module 1480 may form, for example, a dual camera, a 360-degree camera, or a spherical camera. Some of the plurality of lens assemblies 1510 may have the same lens attribute (e.g., view angle, focal length, auto-focusing, f number, or optical zoom), or at least one lens assembly may have one or more lens attributes different from those of another lens assembly. The lens assembly 1510 may include, for example, a wide-angle lens or a telephoto lens.

The flash 1520 may emit light that is used to reinforce light reflected from an object. According to an embodiment, the flash 1520 may include one or more light emitting diodes (LEDs) (e.g., a red-green-blue (RGB) LED, a white LED, an infrared (IR) LED, or an ultraviolet (UV) LED) or a xenon lamp. The image sensor 1530 may obtain an image corresponding to an object by converting light emitted or reflected from the object and transmitted via the lens assembly 1510 into an electrical signal. According to an embodiment, the image sensor 1530 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1530 may be implemented using, for example, a charged coupled device (CCD) sensor or a complementary metal oxide semiconductor (CMOS) sensor.

The image stabilizer 1540 may move the image sensor 1530 or at least one lens included in the lens assembly 1510 in a particular direction, or control an operational attribute (e.g., adjust the read-out timing) of the image sensor 1530 in response to the movement of the camera module 1480 or the electronic device 1401 including the camera module 1480. This allows compensating for at least part of a negative effect (e.g., image blurring) by the movement on an image being captured. According to an embodiment, the image stabilizer 1540 may sense such a movement by the camera module 1480 or the electronic device 1401 using a gyro sensor (not shown) or an acceleration sensor (not shown) disposed inside or outside the camera module 1480. According to an embodiment, the image stabilizer 1540 may be implemented, for example, as an optical image stabilizer.

The memory 1550 may store, at least temporarily, at least part of an image obtained via the image sensor 1530 for a subsequent image processing task. For example, if image capturing is delayed due to shutter lag or multiple images are quickly captured, a raw image obtained (e.g., a Bayer-patterned image, a high-resolution image) may be stored in the memory 1550, and its corresponding copy image (e.g., a low-resolution image) may be previewed via the display device 1460. Thereafter, if a specified condition is met (e.g., by a user's input or system command), at least part of the raw image stored in the memory 1550 may be obtained and processed, for example, by the image signal processor 1560. According to an embodiment, the memory 1550 may be configured as at least part of the memory 1430 or as a separate memory that is operated independently from the memory 1430.

The image signal processor 1560 may perform one or more image processing with respect to an image obtained via the image sensor 1530 or an image stored in the memory 1550. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1560 may perform control (e.g., exposure time control or read-out timing control) with respect to at least one (e.g., the image sensor 1530) of the components included in the camera module 1480. An image processed by the image signal processor 1560 may be stored back in the memory 1550 for further processing, or may be provided to an external component (e.g., the memory 1430, the display device 1460, the electronic device 1402, the electronic device 1404, or the server 1408) outside the camera module 1480. According to an embodiment, the image signal processor 1560 may be configured as at least part of the processor 1420, or as a separate processor that is operated independently from the processor 1420. If the image signal processor 1560 is configured as a separate processor from the processor 1420, at least one image processed by the image signal processor 1560 may be displayed, by the processor 1420, via the display device 1460 as it is or after being further processed.

According to an embodiment, the electronic device 1401 may include a plurality of camera modules 1480 having different attributes or functions. In such a case, at least one of the plurality of camera modules 1480 may form, for example, a wide-angle camera and at least another of the plurality of camera modules 1480 may form a telephoto camera. Similarly, at least one of the plurality of camera modules 1480 may form, for example, a front camera and at least another of the plurality of camera modules 1480 may form a rear camera.

Figure 16:
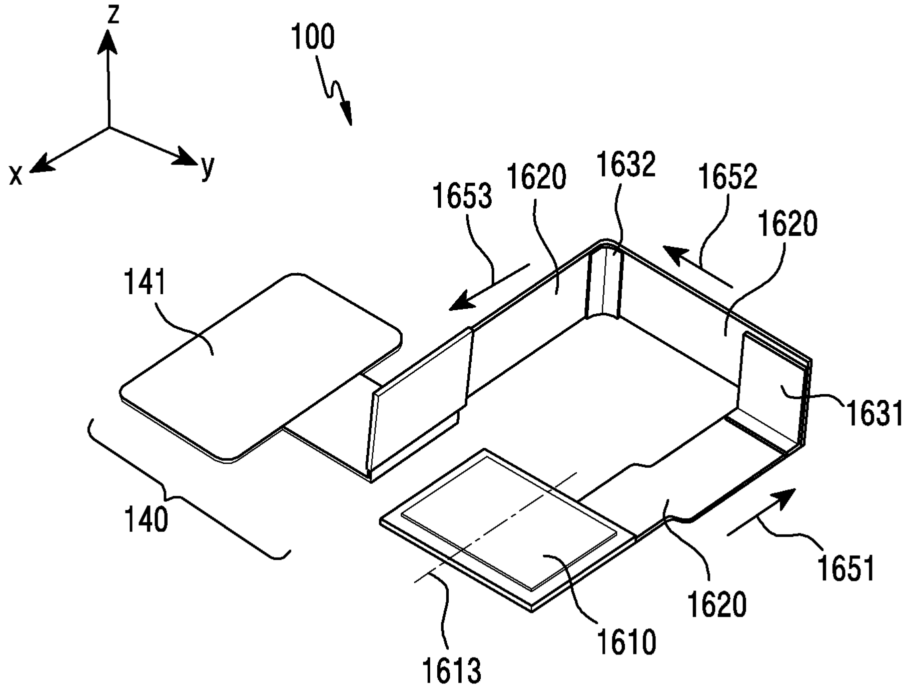
FIG. 16 is a perspective view illustrating an example structure of a circuit connector configured to connect an image sensor and components other than the image sensor according to various embodiments.

FIG. 16 is a perspective view illustrating an example structure of a circuit connector 100 configured to interconnect an image sensor 1610 and components other than the image sensor 1610 according to various embodiments.

The image sensor 1610 and the circuit connector 100 illustrated in FIG. 16 may be included in a camera module. The image sensor 1610 according to an embodiment may be mounted on a circuit board. Alternatively, a separate circuit board on which the image sensor 1610 is mounted may be electrically connected to another circuit board.

In an embodiment, the circuit connector 100 may include a flexible circuit board 1620 including a section extracted from the circuit board on which the image sensor 1610 is mounted and extending in a first direction 1651. The flexible circuit board 1620 may include conductive wires (e.g., the conductive wires 121 in FIG. 1) that electrically connect the image sensor 1610 or the circuit board to other components. The flexible circuit board 1620 may be fabricated without slits.

At least one of the position or the posture of the image sensor 1610 according to an embodiment within the camera module may be controlled by an actuator. The flexible circuit board 1620 may be extracted from a position deviating from a position corresponding to the center 1613 of the image sensor 1610.

The flexible circuit board 1620 according to an embodiment may include a section extending from one end of the section, which extends in the first direction 1651, in a second direction 1652 different from the first direction 1651. When a bent area exists between the section extending in the first direction 1651 and the section extending in the second direction 1652 due to the folding of the flexible circuit board 1620, the circuit connector 100 according to an embodiment may include a rigid area or a stiffener 1631 to maintain the shape of the bent area. The flexible circuit board 1620 may further include a section bent at one end of the section extending in the first direction 1651 and then curved to extend in the second direction 1652. The stiffener 1631 may be attached to an area on the flexible circuit board 1620 including the bent area.

In an embodiment, the flexible circuit board 1620 may include a section extending from one end of the section, which extends in the second direction 1652, in a third direction 1653 different from the second direction 1652. When an area in which the flexible circuit board 1620 is bent also exists between the section extending in the second direction 1652 and the section extending in the third direction 1653, a rigid area or a stiffener 1632 may be disposed.

The flexible circuit board 1620 illustrated in FIG. 16 is illustrated as including the section extending in the first direction 1651, the section extending in the second direction 1652, and the section extending in the third direction 1653. However, the disclosure is not limited thereto.

Figure 17:
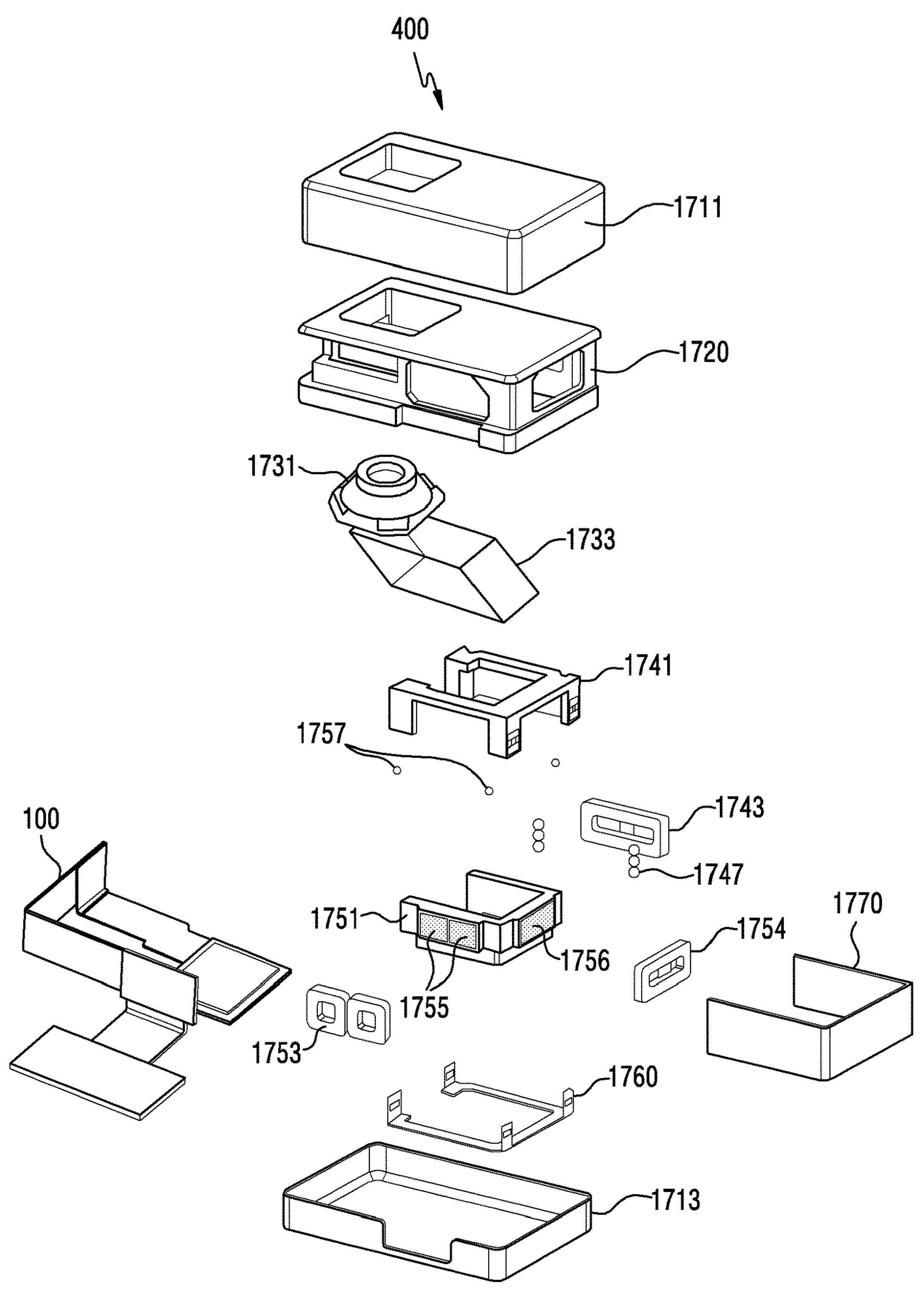
FIG. 17 is an exploded perspective view illustrating an example configuration of a camera module including an image sensor according to various embodiments.

FIG. 17 is an exploded perspective view illustrating a configuration of a camera module 400 including an image sensor according to various embodiments.

In an embodiment, the camera module 400 may include at least one of an upper shield can 1711 and a lower shield can 1713. The components of the camera module 400 may be accommodated in a space defined by at least one of the upper shield can 1711 and the lower shield can 1713. The image sensor of the camera module 400 may be connected to an external circuit of the camera module 400 via the circuit connector 100. The circuit connector 100 may be made of a flexible material so that the image sensor is movable. In an embodiment, the circuit connector 100 may include a flexible circuit board which is not provided with slits or a flexible circuit board which is provided with slits. The image sensor connected to the circuit connector 100 may be disposed on a carrier (e.g., at least one of an OIS carrier 1751 and an AF carrier 1741). The OIS carrier 1751 may be driven by an attractive or repulsive force (or a Lorentz force) generated between OIS coils 1753 and 1754 and OIS magnets 1755 and 1756. Since the circuit board on which the image sensor is disposed is disposed on the carrier, the image sensor is movable within the camera module 400 according to the movement of the carrier. The camera module 400 may further include a housing 1720 configured to arrange other components included in the camera module 400 at appropriate positions within the camera module 400. The housing 1720 may include a frame for fixing at least some of the components.

The camera module 400 according to an embodiment may include an optical system including a lens 1731 and a prism 1733. The optical system included in the camera module 400 according to an embodiment may include a refraction-type optical system in which a light path extending from a subject to the image sensor via the lens 1731 and the prism 1733 is refracted one or more times. For example, the prism 1733 may include a rhomboid prism configured in a parallelogram shape. For example, the prism 1733 may include a dove prism configured in a trapezoidal shape. When the prism 1733 includes the dove prism, the arrangement of the lens 1731 and the image sensor may be configured differently from that illustrated in FIG. 17. For example, the prism 1733 may include a prism having two reflective members.

In an embodiment, the camera module 400 according to an embodiment may include an AF actuator configured to provide an auto-focusing function. Referring to FIG. 17, the AF actuator may include an AF carrier 1741, an AF coil 1743, an AF magnet, and AF balls 1747. The AF magnet may be disposed on one side of the AF carrier 1741 facing the AF coil 1743. The AF carrier 1741 may be driven by an attractive or repulsive force (or a Lorentz force) between the AF magnet and the AF coil. The moving path of the AF carrier 1741 may be guided by a guide groove configured to guide the AF balls 1747 to be movable therein (e.g., a rail provided in the AF carrier 1741). As the AF carrier 1741 is moved, the image sensor disposed on the AF carrier 1741 moves so that a focus control function can be executed.

The camera module 400 according to an embodiment may include an OIS actuator configured to provide an optical image stabilization function. Referring to FIG. 17, the OIS actuator may include an OIS carrier 1751, y-axis OIS coils 1753, y-axis OIS magnets 1755, an x-axis OIS coil 1754, an x-axis OIS magnet 1756, and an OIS balls 1757. The y-axis OIS magnets 1755 may be disposed on one side of the OIS carrier 1751 facing the y-axis OIS coils 1753. The x-axis OIS magnet 1756 may be disposed on one side of the OIS carrier 1751 facing the x-axis OIS coil 1754. The OIS carrier 1751 may be driven by an attractive, repulsive, or Lorentz force acting between the y-axis OIS coils 1753 and the y-axis OIS magnets 1755, and/or an attractive, repulsive, or Lorentz force acting between the x-axis OIS coil 1754 and the x-axis OIS magnet 1756. The movement of the OIS carrier 1751 may be guided by a guide groove provided to allow the OIS balls 1757 to move therein (e.g., a rail provided in the OIS carrier 1751). As the OIS carrier 1751 is driven, the image sensor disposed on the OIS carrier 1751 moves so that an optical image stabilization function can be executed.

The camera module 400 according to an embodiment may further include a z-axis stopper 1760 and a circuit board 1770. The z-axis stopper 1760 may limit the movement range of the OIS carrier 1751 and/or the AF carrier 1741 in the z-axis direction. The circuit board 1770 may be connected to at least one of the AF coil 1743, the y-axis OIS coil 1753, or the x-axis OIS coil 1754. The circuit board 1770 may include a flexible printed circuit board.

The components of the camera module 400 illustrated in FIG. 17 are for purposes of non-limiting illustration, and the camera module 400 according to an embodiment may further include other components or some of the components may be omitted. Alternatively, the camera module 400 may include one of the multiple components illustrated in FIG. 17. According to an embodiment, the magnets and coils of the OIS actuator or the AF actuator as illustrated in FIG. 17 may be replaced with a solenoid type other than the Lorentz type. For example, FIG. 17 illustrates the camera module 400 in which the OIS carrier 1751 and the AF carrier 1741 are guided by using the OIS balls 1757 and the AF balls 1747, but at least one of the OIS carrier 1751 and the AF carrier 1741 may be replaced with a type guided by using a wire.

Figure 18:
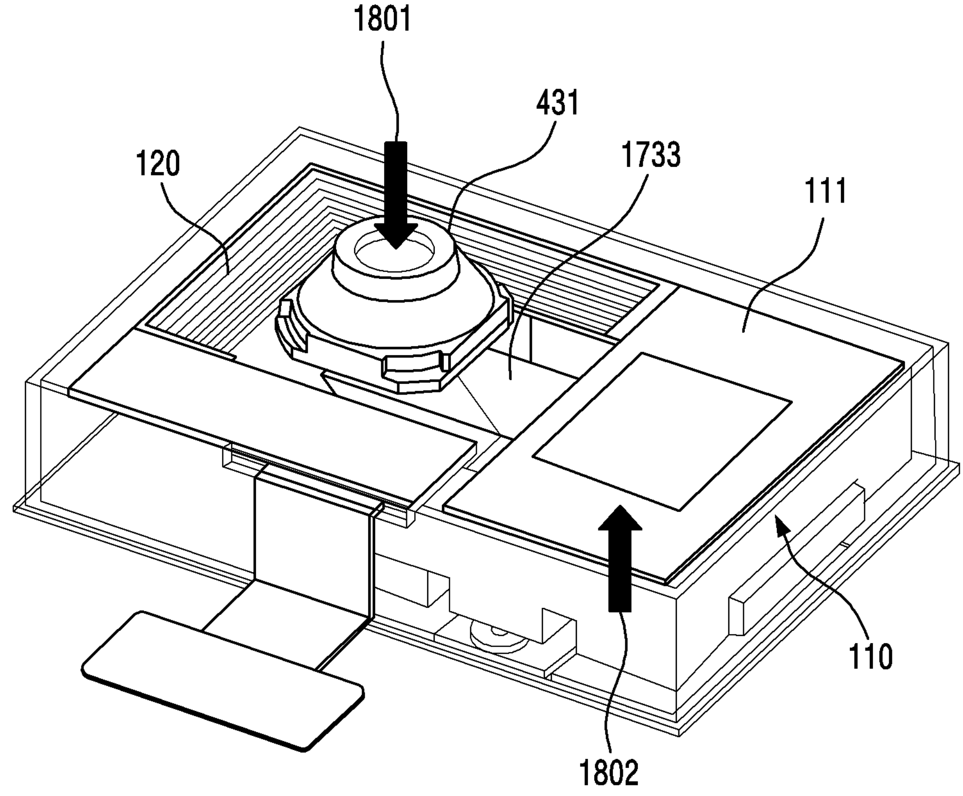
FIG. 18 is a perspective view illustrating a camera module including a rhomboid prism that allows an image sensor to receive light in a direction opposite to a direction in which light enters the camera module according to various embodiments.

FIG. 18 is a perspective view illustrating a camera module including a dove prism 1733 that allows an image sensor to receive light in a direction opposite to a direction in which light enters the camera module according to various embodiments.

In an embodiment, the camera module may include an image sensor 110 disposed on a circuit board 111, a flexible circuit board 120 connected to the circuit board 111, a lens 431, and a dove prism 1733. The dove prism 1733 may be configured to guide a path of light such that light entering in a first direction 1801 is incident to the image sensor 110 in a second direction 1802 substantially opposite to the first direction 1801. The flexible circuit board 120 may include slits provided between areas where the conductive wires are arranged.

Figure 19:
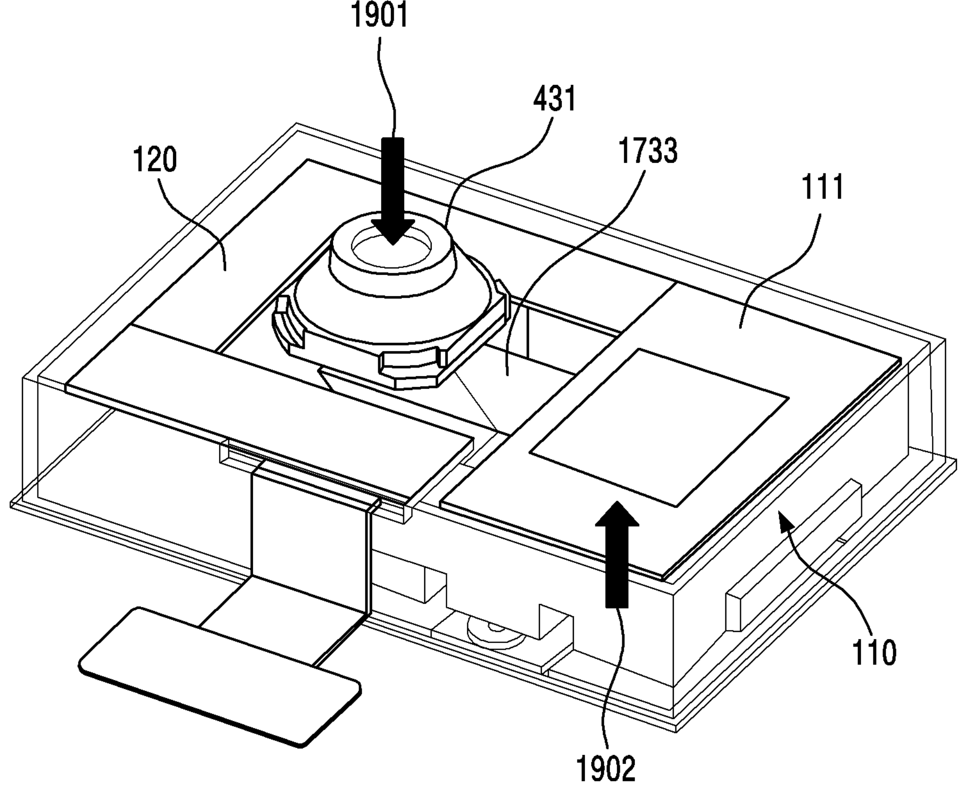
FIG. 19 is a perspective view illustrating an example of a camera module in which a circuit connector does not include slits according to various embodiments.

FIG. 19 is a perspective view illustrating an example of a camera module in which a circuit connector does not include slits according to various embodiments.

In an embodiment, the camera module may include an image sensor 110 disposed on a circuit board 111, a flexible circuit board 120 connected to the circuit board 111, a lens 431, and a dove prism 1733. The dove prism 1733 may be configured to guide a path of light such that light entering in a first direction 1901 is incident to the image sensor 110 in a second direction 1902 substantially opposite to the first direction 1901. The flexible circuit board 120 may not include the slits illustrated in FIG. 18.

Figure 20:
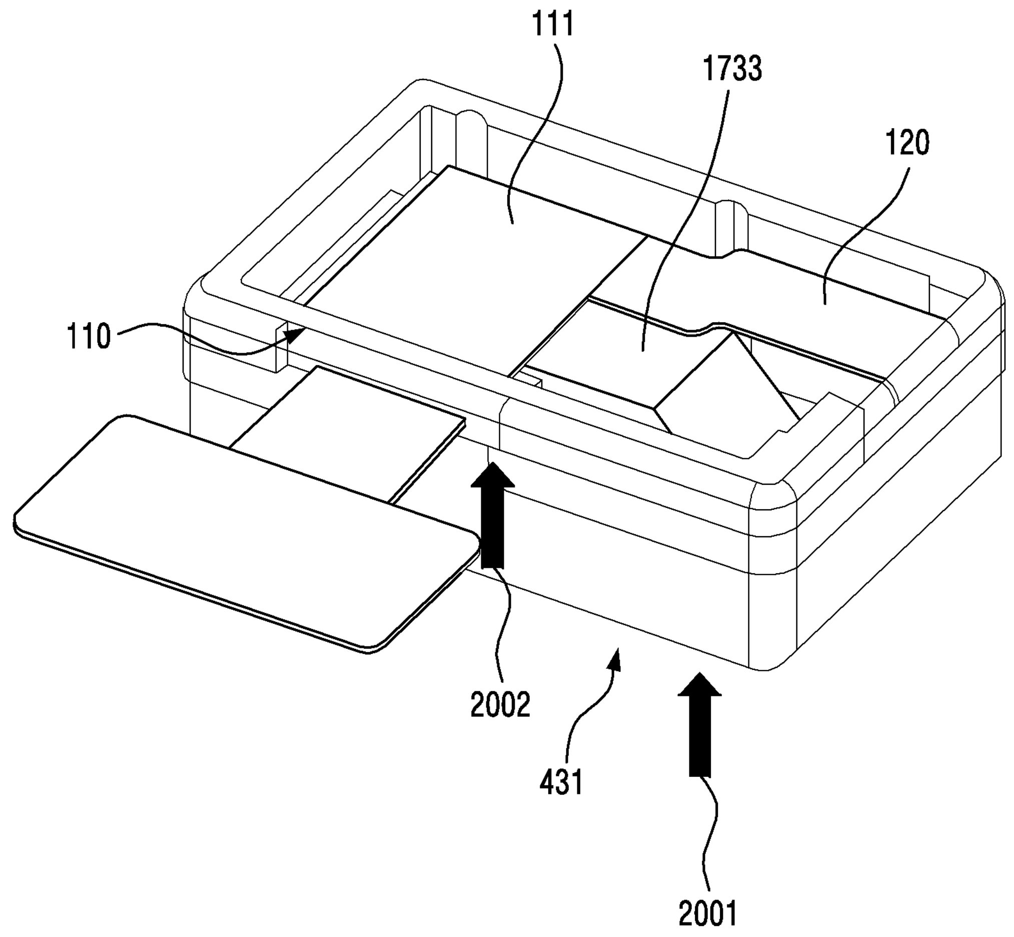
FIG. 20 is a perspective view illustrating an example of a camera module in which a circuit connector does not include slits according to various embodiments.

FIG. 20 is a perspective view illustrating an example of a camera module in which a circuit connector does not include slits according to various embodiments.

The example illustrated in FIG. 20 illustrates a camera module including a flexible circuit board 120 which is not provided with slits, instead of the flexible circuit board 120-2 illustrated in FIG. 7B. In an embodiment, the camera module may include the rhomboid prism 1733 configured to allow the light, which enters in a first direction 2001 through the lens 431, to be incident to the image sensor mounted on the circuit board in a second direction 2002 substantially parallel to the first direction 2001.

Figure 21:
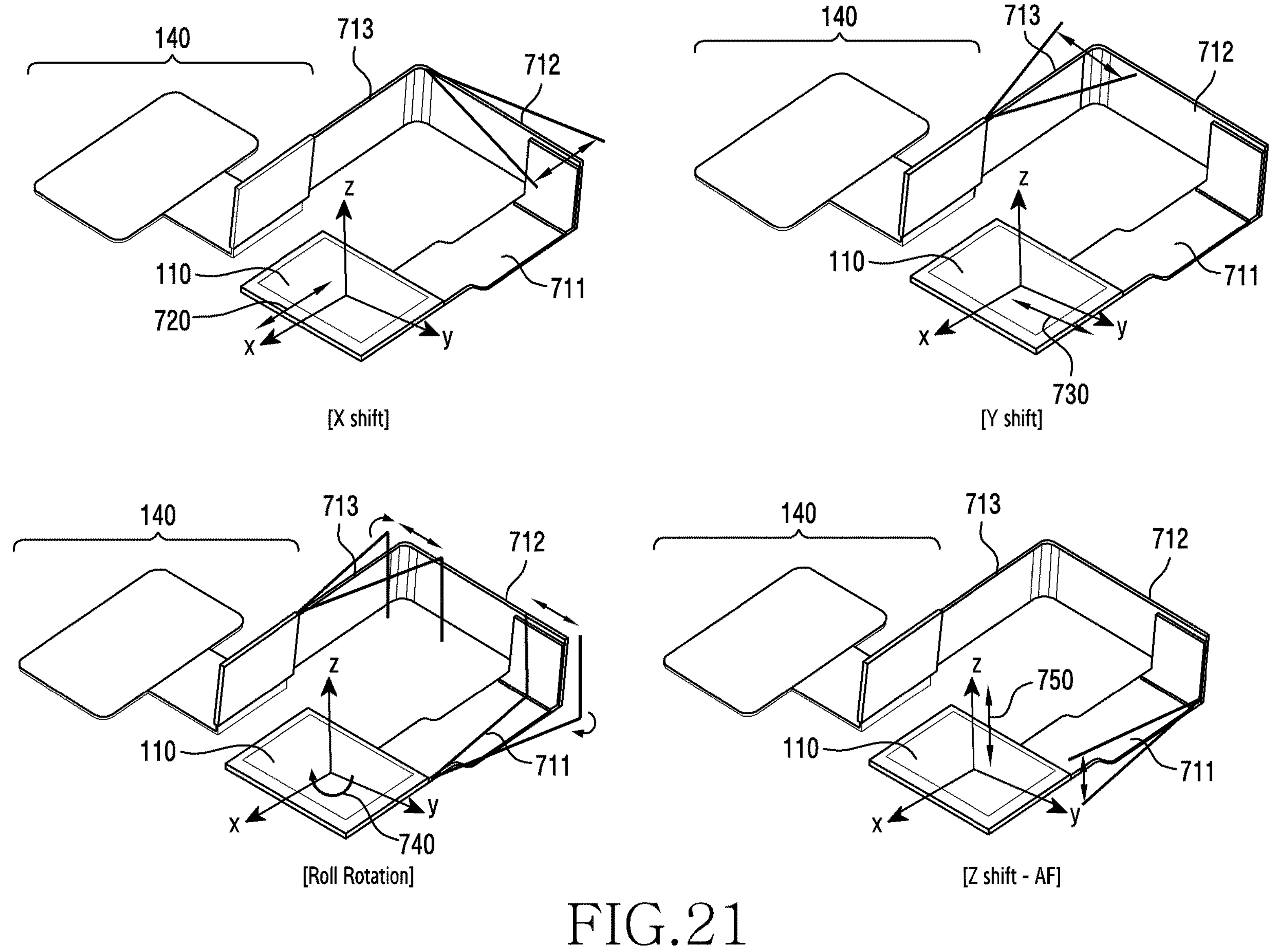
FIG. 21 are perspective views illustrating directions in which a circuit connector is deformable to allow movement of an image sensor as an optical image stabilization function or an auto-focusing function is executed according to various embodiments.

FIG. 21 includes perspective views illustrating directions in which a circuit connector may be deformed to allow movement of an image sensor as an optical image stabilization function or an auto-focusing function is executed according to various embodiments.

In an embodiment, even when no slits are provided in the operating sections 711, 712, and 713 of the flexible circuit board, the position of the image sensor 110 may be shifted because the flexible circuit board is made of a flexible material.

When the electronic device detects at least one component among a pitch axis direction, a yaw axis direction, or roll axis direction of the motion of the camera module, the electronic device may drive the actuator included in the camera module such that the image sensor moves in at least one of the x-axis direction or the y-axis direction or changes the posture thereof to execute optical image stabilization.

The circuit connector 100 of the camera module according to an embodiment may include at least one operating section, of which the shape is deformable according to the movement of the image sensor 110. For convenience of description, FIG. 21 illustrates an embodiment in which the circuit connector 100 includes a first operating section 711 extending from the image sensor 110, a second operating section 712 extending from the first operating section 711, and a third operating section 713 connected to a fixed portion 140 from the second operating section 712.

The image sensor 110 may be moved by driving the actuator. When the image sensor 110 moves in the x-axis direction 720 with reference to the fixed portion 140, the movement of the image sensor 110 in the x-axis direction 720 may be allowed while the second section 712 is deformed. When the image sensor 110 moves in the y-axis direction 730 with reference to the fixed portion 140, the movement of the image sensor 110 in the y-axis direction 730 may be allowed while the third section 713 is deformed. The image sensor 110 may perform roll rotation about the z-axis to execute optical image stabilization. When the image sensor 110 performs the roll rotation 740, the roll rotation 740 of the image sensor 110 may be allowed while the first section 711 and the third section 713 are deformed. According to the roll rotation 740 of the image sensor 110, the flexible circuit board including the first section 711 and the third section 713 may be deformed while shifting and rotating on the x-y plane.

To perform an auto-focusing (AF) function, the image sensor may move in the z-axis direction. When the image sensor 110 moves in the z-axis direction 750 with reference to the fixed portion 140, the movement of the image sensor 110 in the z-axis direction 750 may be allowed while the first section 711 is deformed.

FIG. 21 illustrates an operation of the circuit connector 100 according to an embodiment, and the description "some sections are deformed" does not necessarily refer, for example, to the remaining sections not being deformed. In addition, the movement of at least one of the position or the posture of the image sensor 110 may be executed by the operation of another section in addition to the operation of the above-described circuit connector 100.

As illustrated in FIG. 21, the operating direction of the flexible circuit board included in the circuit connector 100 may vary depending on the extension direction and the bent or curved position of the flexible circuit board according to various embodiments. However, an example in which at least one of the position or the posture of the image sensor is changed while the flexible circuit board is deformed in the operating direction and a low repulsive force is generated may be equally applicable.

A section that is deformable as the image sensor is moved in the circuit connector 100 may be referred to as an operating section or an operating portion. A section which is not deformed and maintains a fixed shape even when the image sensor 110 is moved in the circuit connector 100 may be referred to as a fixed section or a fixed portion.

Figure 22:
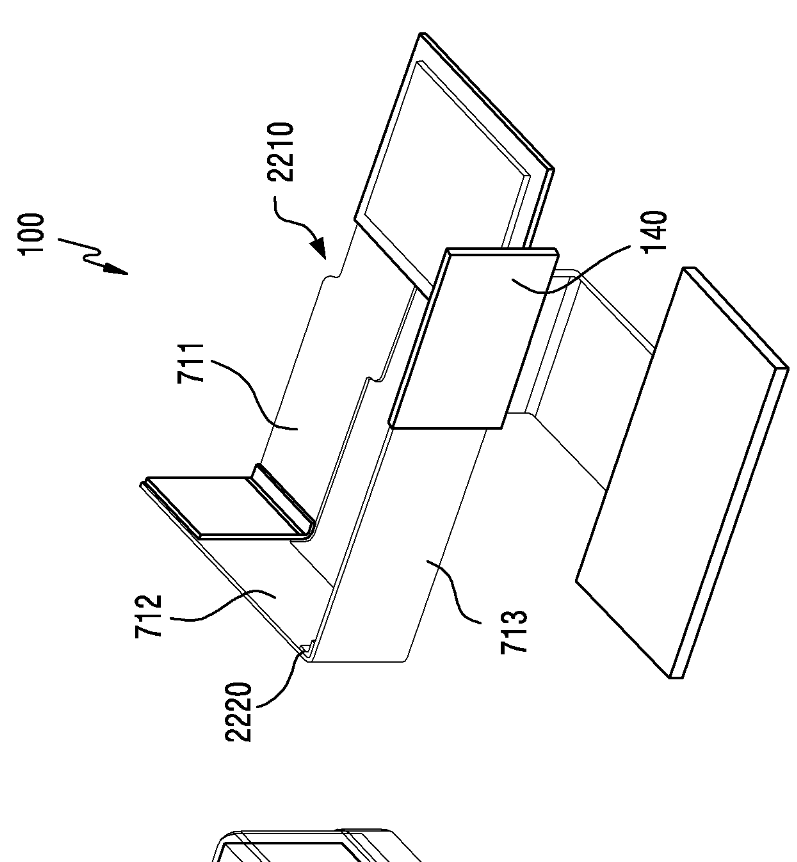
FIG. 22 is a perspective view illustrating a circuit connector including a curved area without slits in an operating section and a camera module including the circuit connector according to various embodiments.
Figure 22:
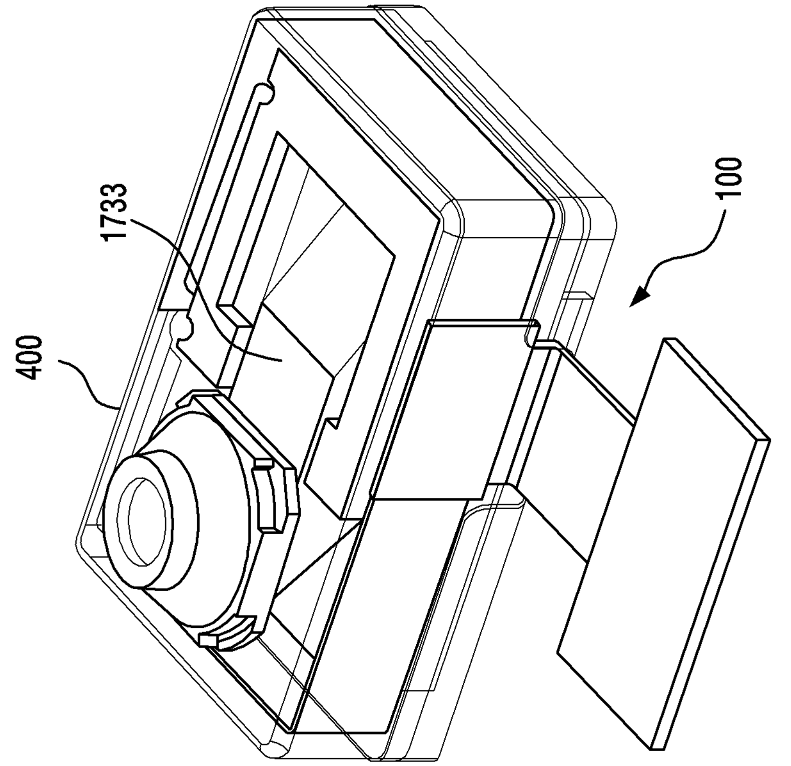
Figure 22:
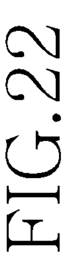

FIG. 22 is a perspective view illustrating a circuit connector 100 in which an area 2210 that is curved without slits is included in operating sections 711, 712, and 713 of a flexible circuit board, and a camera module 400 including the circuit connector 100 according to various embodiments.

The circuit connector 100 of the camera module 400 according to an embodiment may include a flexible circuit board 2220 in which no slits are present. The curved area 2210 may be included in the operating sections 711, 712, and 713 of the flexible circuit board 2220. The curved area 2210 may be provided to shift the position of the first operating section 711 so that one end of the first operating section 711 is connected to one end of the second operating section 712.

The camera module 400 according to an embodiment may further include a rhomboid prism 1733.

Figure 23:
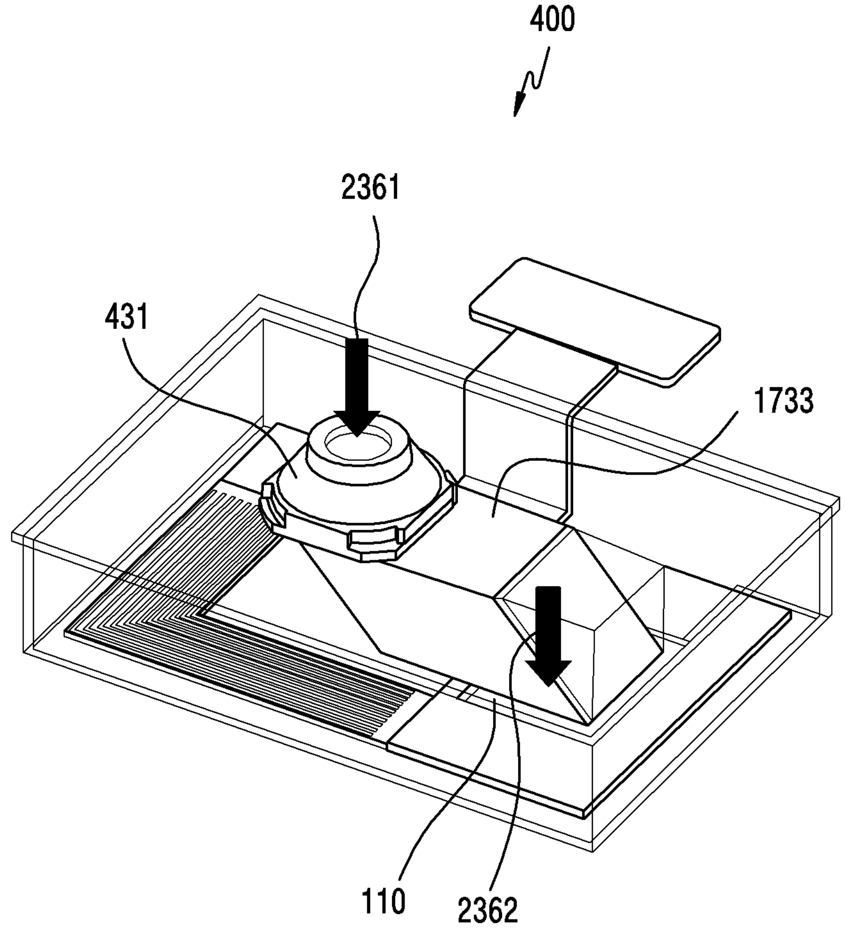
FIG. 23 is a perspective view illustrating an example, in which a flexible circuit board is disposed on substantially the same plane as an image sensor, a circuit connector includes a bent area and slits in an operating section, and the circuit connector is mounted in a camera module including a rhomboid prism, according to various embodiments.

FIG. 23 is a perspective view illustrating an example, in which a flexible circuit board is disposed on substantially the same plane as an image sensor, a circuit connector includes a bent area in an operating section, and the circuit connector is mounted in a camera module including a rhomboid prism, according to various embodiments.

In an embodiment, the camera module 400 may include a rhomboid prism 1733, which is arranged such that light entering in a first direction 2361 through the lens 431 is incident to the image sensor 110 in a second direction 2362 substantially parallel to the first direction 2361.

Figure 24:
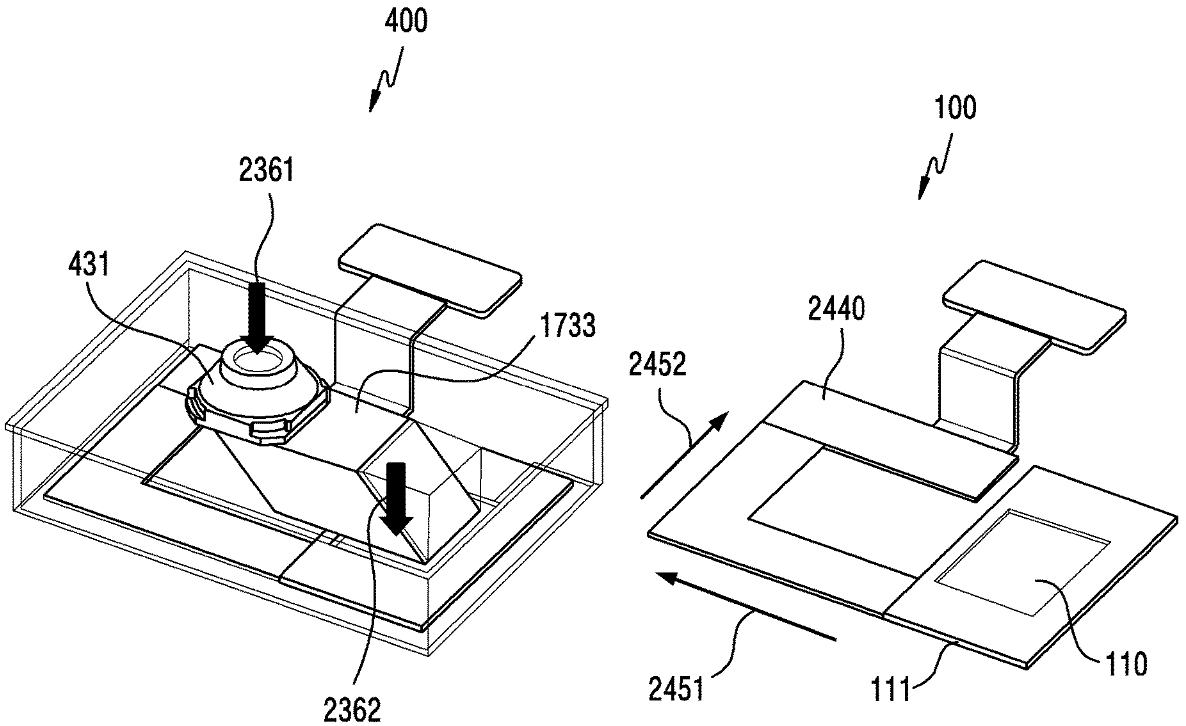
FIG. 24 is a perspective view illustrating a camera module, in which the direction in which light enters and the direction in which light is received by a sensor are substantially the same, according to various embodiments.

FIG. 24 is a perspective view illustrating a camera module 400, in which the direction in which light enters and the direction in which light is received by a sensor are substantially the same, according to various embodiments.

In an embodiment, the camera module 400 may include a rhomboid prism 1733, which is arranged such that light entering in the first direction 2361 through the lens 431 is incident to the image sensor 110 in the second direction 2362 substantially parallel to the first direction 2361.

Figure 25:
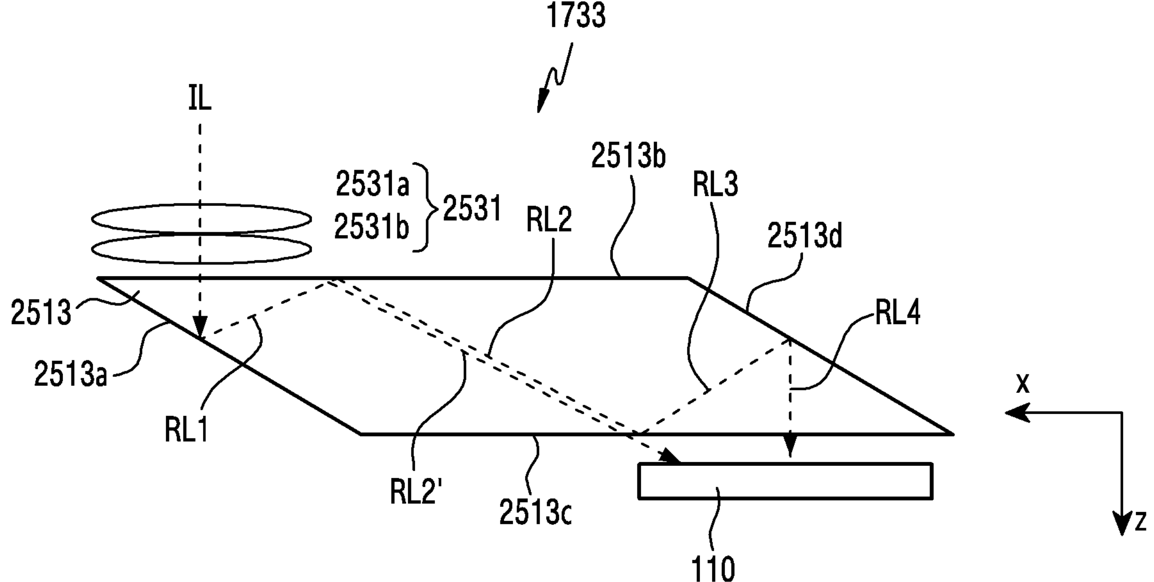
FIG. 25 is a diagram illustrating an example optical path within an optical system of an electronic device according to various embodiments.

In an embodiment, the camera module 400 may include a flexible printed circuit board extends in the third direction 2451 without a slit from the substrate 111 on which the image sensor 110 is mounted, and extends in the fourth direction 2452 from one end extending in the third direction 2451. The flexible printed circuit board extending in the fourth direction 2452 may be connected to the fixed portion 2440. FIG. 25 is a diagram illustrating an example optical path in an optical system of a camera module (e.g., the camera module 400 in FIG. 4 or FIG. 17) according to various embodiments. FIG. 25 illustrates an example of an optical system including a rhomboid prism.

In an embodiment, an optical system included in a camera module (e.g., a prism 433 and a lens included in the lens 431 in FIG. 4, the lens assembly 1510 in FIG. 15, the lens 1731 and the prism 1733 in FIG. 17) may provide a first light path by refracting or reflecting light at least twice. Referring to FIG. 25, a first light path may be indicated by a dotted line, and the light traveling along the first light path may follow the path indicated by "IL", "RL1", "RL2", "RL3", and "RL4" in FIG. 25. In an embodiment, the first light path may be a light path that passes through the center of a lens included in an optical system and is substantially perpendicularly incident to the image sensor. The first light path may be provided by at least one reflective member included in the optical system and at least one lens that may be additionally provided to the at least one reflective member according to an embodiment. For example, the optical system may include one reflective member 2513. The reflective member 2513 may include, for example, a trapezoidal prism or mirror structure. When the reflective member 2513 has a parallel trapezoidal prism or mirror structure, the reflective member 2513 may include, for example, a first reflective surface 2513*a*, a second reflective surface 2513*b*, a third reflective surface 2513*c*, and a fourth reflective surface 2513*d*. In the embodiment illustrated in FIG. 25, the first reflective surface 2513*a* and the fourth reflective surface 2513*d* may be parallel to each other, and the second reflective surface 2513*b* and the third reflective surface 2513*c* may be parallel to each other. In the embodiment illustrated in FIG. 25, the reflective member 2513 may include a parallelogram prism or mirror structure. However, the optical system in the embodiment of the disclosure is not limited thereto. For example, the first reflective surface 2513*a* and the fourth reflective surface 2513*d* may form an equilateral trapezoid having the second reflective surface 2513*b* or the third reflective surface 2513*c* as a base and having two equal interior angles (base angles). In an embodiment, the reflective member 2513 included in the optical system of the camera module may include a one-body trapezoidal prism or mirror structure. Alternatively, the reflective member 2513 having a trapezoidal prism or mirror structure may be provided by combining and/or coupling a plurality of prism or mirror pieces.

In an embodiment, the optical system of the camera module may include a plurality of reflective members. For example, the optical system may provide the first light path by including at least two reflective members to refract or reflect light at least twice. When the optical system includes a plurality of reflective members, at least one lens system may be further included among the plurality of reflective members.

In an embodiment, the optical system may further include an infrared ray blocking filter (not illustrated). The optical system of the camera module may further include a lens system (e.g., the lens system 2531 including lenses 2531*a* and 2531*b*) configured to guide or focus light IL incident from the outside to at least one reflective member 2513. In an embodiment, the first lens (e.g., the first lens 2531*a*) disposed on the subject side in the lens group 2531 or the optical system may have a refractive power. For example, since the first lens 2531*a* is configured to focus or align the light IL incident from the outside to at least one reflective member 2513, it is possible to miniaturize the optical system from the lens 2531 to the image sensor 110. A camera including an optical system including the lens group 2531 may be referred to as a "lens lead-type camera". According to an embodiment, the lens group 2531 may further include an additional lens 2531*b* to focus or align light incident from the outside.

In an embodiment, the camera module 400 may include a dove-type prism having a trapezoidal shape instead of the rhomboid-type prism having a parallelogram shape illustrated in FIG. 25. Referring to FIG. 25, a trapezoidal prism or mirror structure (or a parallelogram prism or mirror structure) and a refractive optical system including the same may be designed such that only the light that is refracted or reflected by each of the first reflective surface 2513*a*, the second reflective surface 2513*b*, the third reflective surface 2513*c*, and the fourth reflective surface 2513*d*, respectively, that is, such that only light refracted or reflected 4 times is incident to the image sensor. In an embodiment, as illustrated in FIG. 25, at least some of the light refracted or reflected by the reflective member 2513 may enter the image sensor 110 through a second optical path different from the first optical path. The second light path may be the path indicated by a one-dotted chain line. The light traveling along the second light path may follow the path indicated by "IL", "RL1", and "RL2"" in FIG. 25. For example, in a trapezoidal prism or mirror structure (or a parallelogram prism or mirror structure) and a refractive optical system including the same, light refracted or reflected by the first reflective surface 2513*a* and the second reflective surface 2513*b*, that is, light refracted or reflected twice is capable of being incident to the image sensor 110. An image obtained by such light may be output hazy due to occurrence of flare.

In an embodiment, the prism included in the camera module 400 may be the prism 433 having the shape illustrated in FIG. 4. The prism included in the camera module 400 may be the prism 1733 having the shape illustrated in FIG. 17. The components included in the various example embodiments may be used in combination with each other.

For example, the rhomboid-type or dove-type (parallelogram or trapezoidal) prism 1733 illustrated in FIGS. 17 to 20 and 22 to 25 may be included in a camera module 400 including a flexible circuit board having the slits presented in FIGS. 1 to 13.

A camera module (e.g., the camera module 400 of FIG. 4 or the camera 1480 of FIG. 14) according to an example embodiment may include a first circuit board (e.g., the circuit board 111 of FIG. 5) electrically connected to an image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) or a circuit board including the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12), an actuator configured to control at least one of a position or a posture of the first circuit board within the camera module (e.g., the camera module 400 of FIG. 4 or the camera module 1480 of FIG. 14), a flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) extending from at least one side surface of the first circuit board, multiple slits (e.g., the slits 122 of FIG. 1), the slits being disposed between adjacent ones of multiple conductive wires (e.g., the conductive wires 121 of FIG.1) mounted on the flexible circuit board, and a second circuit board electrically connected to one end of the flexible circuit board. The flexible circuit board may include a first section (e.g., the first operating section 711 of FIG. 8) extracted or extending in a first direction from the first circuit board. The flexible circuit board may include a second section (e.g., the second operating section 712 in FIG. 8) extending from one end of the first section in a second direction different from the first direction or fixed to another component of the camera module (e.g., the camera module 400 of FIG. 4 or the camera module 1480 of FIG. 14). The flexible circuit board may be configured to be deformed as the actuator is driven.

The flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of 11, or the flexible circuit board 1220 of FIG. 12) according to an example embodiment may include, between the first section and the second section, a curved section in which the direction in which the flexible circuit board extends is changed. A smaller number of slits than the first section or no slits may be formed in the curved section.

A camera module (e.g., the camera module 400 of FIG. 4 or the camera 1480 of FIG. 14) according to an example embodiment may further include: an optical system including a lens (e.g., the lens 431 of FIG. 4, the prism 433 of FIG. 4, the lens barrels 431-1 and 431-2 of FIG. 7, or the lens 1231 of FIG. 12) configured to guide light incident from a subject to the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12). The flexible circuit board is extracted at a position deviating from a central axis corresponding to an optical axis (e.g., the central axis 113 in FIG. 1) of the optical system on the at least one side surface of the first circuit board.

The camera module (e.g., the camera module 400 of FIG. 4 or the camera module 1480 of FIG. 14) according to an example embodiment may include a housing (e.g., the housing 420 of FIG. 4) accommodating the first circuit board and the optical system. The flexible circuit board may be disposed along at least one surface of the housing around the optical system.

According to an example embodiment, the optical system may include a refraction type optical system wherein an optical path through which light incident from the subject reaches the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is refracted at least twice.

According to an example embodiment, the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is disposed such that a light detecting surface is oriented in an opposite direction to a direction in which light is incident from the subject to the optical system.

According to an example embodiment, the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is disposed such that a light detecting surface is oriented in the same direction as the direction in which light is incident from the subject to the optical system.

According to an example embodiment, the flexible circuit board may further include a third section (e.g., the third operating section 713 of FIG. 3) extending in a third direction different from the second direction.

According to an example embodiment, the flexible circuit board may be configured such that the second section is deformed based on the first circuit board moving in the first direction by the operation of the actuator.

According to an example embodiment, the flexible circuit board may be configured such that the third section is deformed based on the first circuit board moving in the second direction by the operation of the actuator.

According to an example embodiment, the flexible circuit board may be configured such that the first section and the third section are deformed based on the first circuit board rotating by the operation of the actuator.

According to an example embodiment, the actuator may include an auto-focusing actuator configured to provide an auto-focusing function. The flexible circuit board may be configured such that the first section is deformed as the auto-focusing actuator is driven.

According to an example embodiment, the flexible circuit board may include a folded and bent section between the first section and the second section where the flexible circuit board is folded, and a stiffener may be attached to the bent section.

A camera module (e.g., the camera module 400 of FIG. 4 or the camera 1480 of FIG. 14) according to an example embodiment may include a first circuit board electrically connected to an image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) or a circuit board including the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10 the image sensor 1110 of FIG. 11, or the image sensor 1210 of FIG. 12), an actuator configured to control at least one of the position or the posture of the first circuit board within the camera module (e.g., the camera module 400 of FIG. 4 or the camera module 1480 of FIG. 14), a flexible circuit board extracted and extending from at least one side surface of the first circuit board, multiple slits, the slits being disposed between adjacent ones of multiple conductive wires mounted on the flexible circuit board, and a second circuit board connected to one end of the flexible circuit board. The flexible circuit board may include a first section extracted from a position deviated to one side from a central axis of the first circuit board and extending in a first direction, and a second section extending from one end of the first section in a second direction different from the first direction.

According to an example embodiment, an optical system may include a refraction type optical system in which an optical path through which light incident from the subject reaches the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is refracted at least twice.

According to an example embodiment, the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is disposed such that a light detecting surface is oriented in an opposite direction to a direction in which light is incident from the subject to the optical system.

According to an example embodiment, the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) is disposed such that a light detecting surface is oriented in the same direction as the direction in which light is incident from the subject to the optical system.

An electronic apparatus (e.g., the electronic apparatus 600 of FIG. 6 or the electronic apparatus 1400 of FIG. 14) according to an example embodiment may include a camera module including a camera, a circuit board electrically connected to an image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12) or a circuit board including the image sensor (e.g., the image sensor 110 of FIG. 1, the image sensor 110 of FIG. 4, the image sensor 110 of FIG. 5, the image sensors 110-1 and 110-2 of FIG. 7, the image sensor 110 of FIG. 8, the image sensor 1010 of FIG. 10, the image sensor 1110 of FIG. 11, or the image sensor 1210 of FIG. 12), an actuator configured to control at least one of the position or the posture of the circuit board within the camera module (e.g., the camera module 400 of FIG. 4 or the camera module 1480 of FIG. 14), a fixed portion fixed inside the electronic apparatus, and a flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) interconnecting the circuit board and the fixed portion and configured to be deformed as the actuator is driven. Multiple slits may be formed in the operating section.

According to an example embodiment, the flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) may include multiple conductive wires. The multiple slits may be disposed in parallel to the conductive wires.

According to an example embodiment, the flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) may include a curved section wherein a direction in which the flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) extends is changed within the operating section (e.g., the operating sections 711, 712, and 713 in FIG. 8). The flexible circuit board (e.g., the flexible circuit board 120 of FIG. 1, the flexible circuit board 120 of FIG. 5, the flexible circuit boards 120-1 and 120-2 of FIG. 7, the flexible circuit board 1020 of FIG. 10, the flexible circuit board 1120 of FIG. 11, or the flexible circuit board 1220 of FIG. 12) may be configured such that the conductive wires are joined together without a gap between adjacent conductive wires within the curved section.

The methods according to the example embodiments described in the claims or the disclosure may be implemented in the form of hardware, software, or a combination of hardware and software.

In the above-described specific embodiments of the disclosure, components included in the disclosure have been expressed in singular or plural terms according to the presented specific embodiments. However, the singular or plural expressions are selected appropriately for the situation presented for convenience of description, and the disclosure is not limited to a singular element or plural elements. An element expressed in a plural form may be configured with a singular element, or an element expressed in a singular form may be configured with plural elements.

Meanwhile, in the detailed description of the disclosure, various example embodiments have been illustrated and described. I will be understood that the various embodiments are intended to be illustrative, not limiting. It will be further understood by those skilled in the art that various modifications are possible without departing from the scope of the disclosure. Therefore, the scope of the disclosure shall not be limited to the described embodiments, but shall include not only the claims described below but also equivalents to the claims. It will also be understood that any of the embodiment(s) described herein may be used in conjunction with any other embodiment(s) described herein.

What is claimed is:

1. A camera module comprising:

a first circuit board electrically connected to an image sensor or a circuit board comprising the image sensor;

an actuator configured to control at least one of a position or a posture of the image sensor within the camera module;

a flexible circuit board extracted and extending from at least one side surface of the first circuit board;

a plurality of slits disposed between adjacent ones of multiple conductive wires mounted on the flexible circuit board; and a second circuit board electrically connected to one end of the flexible circuit board, wherein the flexible circuit board comprises a first section extending in a first direction from the first circuit board and a second section extending from one end of the first section in a second direction different from the first direction, and the flexible circuit board is configured to be deformed based on the actuator being driven, and wherein the plurality of slits comprise a plurality of first slits formed in parallel with each other in the first direction in the first section, a plurality of second slits formed in parallel with each other in the second direction in the second section, and the plurality of first slits are disjoined from the plurality of second slits in at least a section of the flexible circuit board between the first section and the second section where the direction of flexible circuit board changes.

2. The camera module of claim 1, wherein the section of the flexible circuit board between the first section and the second section comprises a curved section in which a direction in which the flexible circuit board extends is changed, and wherein the curved section includes no slits.

3. The camera module of claim 1, further comprising an optical system comprising an optical path configured to guide light incident from a subject to the image sensor, wherein the flexible circuit board is extracted at a position deviating from a central axis corresponding to an optical axis of the optical system on the at least one side surface of the first circuit board.

4. The camera module of claim 3, further comprising a housing accommodating the first circuit board and the optical system, wherein the flexible circuit board is disposed along at least one surface of the housing around the optical system.

5. The camera module of claim 3, wherein the optical system comprises a refraction type optical system in which an optical path through which light incident from the subject reaches the image sensor is refracted at least twice.

6. The camera module of claim 5, wherein the image sensor is disposed such that a light detecting surface is oriented in an opposite direction to a direction in which light is incident from the subject to the optical system.

7. The camera module of claim 5, wherein the image sensor is disposed such that a light detecting surface is oriented in a same direction as a direction in which light is incident from the subject to the optical system.

8. The camera module of claim 1, wherein the flexible circuit board further comprises a third section extending in a third direction different from the second direction.

9. The camera module of claim 8, wherein the second section is configured to be deformed as the first circuit board moves in the first direction as the actuator is driven.

10. The camera module of claim 8, wherein the third section is configured to be deformed as the first circuit board moves in the second direction as the actuator is driven.

11. The camera module of claim 8, wherein the first section and the third section are configured to be deformed as the first circuit board rotates as the actuator is driven.

12. The camera module of claim 8, wherein the actuator comprises an auto-focusing actuator configured to provide an auto-focusing function, and the first section is configured to be deformed as the auto-focusing actuator is driven.

13. The camera module of claim 1, wherein the flexible circuit board comprises a folded and bent section between the first section and the second section, and a stiffener is attached to the bent section.

14. A camera module comprising:

a first circuit board electrically connected to an image sensor or a circuit board comprising the image sensor;

an actuator configured to control at least one of a position or a posture of the image sensor within the camera module;

a flexible circuit board extracted and extending from at least one side surface of the first circuit board;

a plurality of slits disposed between adjacent ones of multiple conductive wires mounted on the flexible circuit board; and a second circuit board connected to one end of the flexible circuit board, wherein the flexible circuit board comprises a first section extracted from a position deviated to one side from a central axis of the first circuit board and extending in a first direction, and a second section extending from one end of the first section in a second direction different from the first direction, and wherein the plurality of slits comprise a plurality of first slits formed in parallel with each other in the first direction in the first section, a plurality of second slits formed in parallel with each other in the second direction in the second section, and the plurality of first slits are disjoined from the plurality of second slits in at least a section of the flexible circuit board between the first section and the second section where the direction of flexible circuit board changes.

15. The camera module of claim 14, further comprising an optical system comprising an optical path configured to guide light incident from a subject to the image sensor, wherein the flexible circuit board is extracted at a position deviating from a central axis corresponding to an optical axis of the optical system on the at least one side surface of the first circuit board, and wherein the optical system comprises a refraction type optical system in which an optical path through which light incident from the subject reaches the image sensor is refracted at least twice.

16. The camera module of claim 15, wherein the image sensor is disposed such that a light detecting surface is oriented in an opposite direction to a direction in which light is incident from the subject to the optical system.

17. The camera module of claim 15, wherein the image sensor is disposed such that a light detecting surface is oriented in a same direction as a direction in which light is incident from the subject to the optical system.

18. An electronic apparatus comprising a camera module, the electronic apparatus comprising:

a circuit board electrically connected to an image sensor or a circuit board comprising the image sensor;

an actuator configured to control at least one of a position or a posture of the image sensor within the camera module;

a fixed portion fixed inside the electronic apparatus; and a flexible circuit board interconnecting the circuit board and the fixed portion and comprising an operating section deformed as the actuator is driven, wherein a plurality of slits are formed in the operating section including a first section and a second section, and the plurality of slits comprise a plurality of first slits formed in parallel with each other in a direction in the first section, a plurality of second slits formed in parallel with each other in a second direction in the second section, and the plurality of first slits are disjoined from the plurality of second slits in at least a section of the flexible circuit board between the first section and the second section where the direction of flexible circuit board changes.

19. The electronic apparatus of claim 18, wherein the flexible circuit board comprises multiple conductive wires, and the plurality of slits are disposed in parallel to the conductive wires.

20. The electronic apparatus of claim 19, wherein the section of the flexible circuit board between the first section and the second section comprises a curved section in which a direction in which the flexible circuit board extends is changed within the operating section, and the conductive wires are joined together without a gap between adjacent ones of the conductive wires in the curved section.

* * * * *